United States Patent
Carlson et al.

(10) Patent No.: US 8,682,793 B2
(45) Date of Patent: *Mar. 25, 2014

(54) MOBILE ALERT TRANSACTION SYSTEM AND METHOD

(71) Applicant: Visa International Service Association, San Francisco, CA (US)

(72) Inventors: Mark Carlson, Half Moon Bay, CA (US); Patrick Faith, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,940

(22) Filed: May 28, 2013

(65) Prior Publication Data

US 2013/0262312 A1  Oct. 3, 2013

Related U.S. Application Data

(63) Continuation of application No. 12/491,125, filed on Jun. 24, 2009, now Pat. No. 8,478,692.

(60) Provisional application No. 61/076,099, filed on Jun. 26, 2008.

(51) Int. Cl.
 *G06Q 40/00* (2012.01)
 *G06Q 20/04* (2012.01)

(52) U.S. Cl.
 CPC .................................... *G06Q 20/04* (2013.01)
 USPC ................... 705/44; 705/50; 705/40; 705/39; 705/75; 726/19; 235/380; 345/690

(58) Field of Classification Search
 USPC ............. 705/50, 40, 39, 75; 726/19; 235/380; 345/690
 See application file for complete search history.

(56) References Cited

U.S. PATENT DOCUMENTS 4,528,442 A  7/1985  Endo
4,613,904 A  9/1986  Lurie
(Continued)

FOREIGN PATENT DOCUMENTS

KR  10-2004-0094249 A  11/2004
KR  10-2006-0025495 A  3/2006
(Continued)

OTHER PUBLICATIONS

U.S. Appl. No. 60/335,667, filed Feb. 5, 2002.
(Continued)

*Primary Examiner* — Tien Nguyen
(74) *Attorney, Agent, or Firm* — Kilpatrick Townsend & Stockton LLP

(57) ABSTRACT

A method and system for providing geographic location notifications of payment transactions is disclosed. One embodiment of the invention is directed to a method including receiving an authorization request message associated with a transaction, the transaction associated with a portable consumer device and an access device at a merchant. A geographic location of the transaction is determined. It is determined whether a notification message indicating that the transaction is occurring is required. Upon determining that the notification message is required, the notification message is sent to a notification device operated by a consumer and the notification device receives the notification message substantially simultaneously with the merchant's receipt of an authorization response message. A graphical depiction of the notification message is displayed on a map on the notification device.

21 Claims, 14 Drawing Sheets

(56) References Cited

U.S. PATENT DOCUMENTS

| | | |
|---|---|---|
| 5,311,594 A | 5/1994 | Penzias |
| 5,420,926 A | 5/1995 | Low et al. |
| 5,448,471 A | 9/1995 | Deaton et al. |
| 5,483,444 A | 1/1996 | Heintzeman et al. |
| 5,502,636 A | 3/1996 | Clarke |
| 5,513,250 A | 4/1996 | McAllister |
| 5,530,438 A | 6/1996 | Bickham et al. |
| 5,592,560 A | 1/1997 | Deaton et al. |
| 5,604,921 A | 2/1997 | Alanara |
| 5,615,110 A | 3/1997 | Wong |
| 5,627,549 A | 5/1997 | Park |
| 5,642,485 A | 6/1997 | Deaton et al. |
| 5,679,938 A | 10/1997 | Templeton et al. |
| 5,679,940 A | 10/1997 | Templeton et al. |
| 5,708,422 A | 1/1998 | Blonder et al. |
| 5,717,866 A | 2/1998 | Naftzger |
| 5,774,525 A | 6/1998 | Kanevsky et al. |
| 5,852,775 A | 12/1998 | Hidary |
| 5,870,030 A | 2/1999 | Deluca et al. |
| 5,872,834 A | 2/1999 | Teitelbaum |
| 5,878,337 A | 3/1999 | Joao et al. |
| 5,884,277 A | 3/1999 | Khosla |
| 5,903,830 A | 5/1999 | Joao et al. |
| 5,903,878 A | 5/1999 | Talati et al. |
| 5,914,472 A | 6/1999 | Foladare et al. |
| 5,924,080 A | 7/1999 | Johnson |
| 5,959,577 A | 9/1999 | Fan et al. |
| 5,988,497 A | 11/1999 | Wallace |
| 5,991,750 A | 11/1999 | Watson |
| 5,995,823 A * | 11/1999 | Stephens ............... 455/410 |
| 6,003,326 A | 12/1999 | Hensley |
| 6,012,144 A | 1/2000 | Pickett |
| 6,014,634 A | 1/2000 | Scroggie et al. |
| 6,049,778 A | 4/2000 | Walker et al. |
| 6,052,675 A | 4/2000 | Checchio |
| 6,055,505 A | 4/2000 | Elston |
| 6,055,570 A | 4/2000 | Nielsen |
| 6,062,991 A | 5/2000 | Moriarty et al. |
| 6,064,990 A | 5/2000 | Goldsmith |
| 6,067,529 A | 5/2000 | Ray et al. |
| 6,081,792 A | 6/2000 | Cucinotta et al. |
| 6,095,413 A | 8/2000 | Tetro et al. |
| 6,122,624 A | 9/2000 | Tetro et al. |
| 6,185,290 B1 | 2/2001 | Shaffer et al. |
| 6,185,541 B1 | 2/2001 | Scroggie et al. |
| 6,195,542 B1 | 2/2001 | Griffith |
| 6,219,793 B1 | 4/2001 | Li et al. |
| 6,263,447 B1 | 7/2001 | French et al. |
| 6,292,786 B1 | 9/2001 | Deaton et al. |
| 6,311,169 B2 | 10/2001 | Duhon |
| 6,317,718 B1 | 11/2001 | Fano |
| 6,318,631 B1 | 11/2001 | Halperin |
| 6,330,550 B1 | 12/2001 | Brisebois et al. |
| 6,336,098 B1 | 1/2002 | Fortenberry et al. |
| 6,336,099 B1 | 1/2002 | Barnett et al. |
| 6,353,398 B1 | 3/2002 | Amin et al. |
| 6,381,324 B1 | 4/2002 | Shaffer et al. |
| 6,424,949 B1 | 7/2002 | Deaton et al. |
| 6,424,951 B1 | 7/2002 | Shurling et al. |
| 6,470,181 B1 | 10/2002 | Maxwell |
| 6,484,146 B2 | 11/2002 | Day et al. |
| 6,484,148 B1 | 11/2002 | Boyd |
| 6,488,206 B1 | 12/2002 | Flaig et al. |
| 6,496,936 B1 | 12/2002 | French et al. |
| 6,505,046 B1 | 1/2003 | Baker |
| 6,529,725 B1 | 3/2003 | Joao et al. |
| 6,535,855 B1 | 3/2003 | Cahill et al. |
| 6,553,100 B1 | 4/2003 | Chen et al. |
| 6,571,279 B1 | 5/2003 | Herz et al. |
| 6,587,835 B1 | 7/2003 | Treyz et al. |
| 6,608,556 B2 | 8/2003 | De Moerloose et al. |
| 6,612,488 B2 | 9/2003 | Suzuki |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,715,672 B1 | 4/2004 | Tetro et al. |
| 6,736,322 B2 | 5/2004 | Gobburu et al. |
| 6,741,188 B1 | 5/2004 | Miller et al. |
| RE38,572 E | 8/2004 | Tetro et al. |
| 6,775,539 B2 | 8/2004 | Deshpande |
| 6,813,606 B2 | 11/2004 | Veyama et al. |
| 6,823,318 B1 | 11/2004 | Creswell et al. |
| 6,832,721 B2 | 12/2004 | Fujii |
| 6,842,774 B1 | 1/2005 | Piccioni |
| 6,857,073 B2 | 2/2005 | French et al. |
| 6,862,575 B1 | 3/2005 | Anttila et al. |
| 6,868,391 B1 | 3/2005 | Hultgren |
| 6,877,661 B2 | 4/2005 | Webb et al. |
| 6,879,838 B2 | 4/2005 | Rankin et al. |
| 6,883,708 B1 | 4/2005 | Fiedler et al. |
| 6,912,398 B1 | 6/2005 | Domnitz |
| 6,913,194 B2 | 7/2005 | Suzuki |
| 6,948,656 B2 | 9/2005 | Williams |
| 6,968,180 B2 | 11/2005 | Kirby et al. |
| 6,970,850 B1 | 11/2005 | Freeny, Jr. |
| 6,988,657 B1 | 1/2006 | Singer et al. |
| 6,993,326 B2 | 1/2006 | Link, II et al. |
| 7,003,497 B2 | 2/2006 | Maes |
| 7,013,286 B1 | 3/2006 | Aggarwal et al. |
| 7,014,107 B2 | 3/2006 | Singer et al. |
| 7,024,211 B1 | 4/2006 | Martin |
| 7,025,256 B1 | 4/2006 | Drummond et al. |
| 7,027,801 B1 | 4/2006 | Hall et al. |
| 7,028,052 B2 | 4/2006 | Chapman et al. |
| 7,028,906 B2 | 4/2006 | Challa et al. |
| 7,040,533 B1 | 5/2006 | Ramachandran |
| 7,058,611 B2 | 6/2006 | Kranzley et al. |
| 7,092,724 B2 | 8/2006 | Fellenstein et al. |
| 7,096,003 B2 | 8/2006 | Joao et al. |
| 7,100,821 B2 | 9/2006 | Rasti |
| 7,107,250 B2 | 9/2006 | Harrison |
| 7,136,841 B2 | 11/2006 | Cook |
| 7,150,393 B1 | 12/2006 | Drummond et al. |
| 7,152,788 B2 | 12/2006 | Williams |
| 7,167,711 B1 * | 1/2007 | Dennis ............... 455/456.1 |
| 7,201,313 B1 | 4/2007 | Ramachandran |
| 7,203,300 B2 | 4/2007 | Shaffer et al. |
| 7,207,477 B1 | 4/2007 | Ramachandran |
| 7,225,156 B2 | 5/2007 | Fisher et al. |
| 7,231,657 B2 | 6/2007 | Honarvar et al. |
| 7,251,624 B1 | 7/2007 | Lee et al. |
| 7,257,545 B1 | 8/2007 | Hung |
| 7,264,154 B2 | 9/2007 | Harris |
| 7,292,996 B2 | 11/2007 | Nobrega et al. |
| 7,310,534 B2 | 12/2007 | Northcutt |
| 7,343,149 B2 | 3/2008 | Benco et al. |
| 7,343,317 B2 | 3/2008 | Jokinen et al. |
| 7,349,668 B2 | 3/2008 | Ilan et al. |
| 7,357,310 B2 | 4/2008 | Calabrese et al. |
| 7,376,431 B2 | 5/2008 | Niedermeyer |
| 7,857,212 B1 | 12/2010 | Matthews |
| 2001/0029485 A1 | 10/2001 | Brody et al. |
| 2001/0049636 A1 | 12/2001 | Hudda et al. |
| 2002/0077964 A1 | 6/2002 | Brody et al. |
| 2002/0087460 A1 | 7/2002 | Hornung |
| 2002/0091569 A1 | 7/2002 | Kitaura et al. |
| 2002/0091945 A1 | 7/2002 | Ross |
| 2002/0102993 A1 | 8/2002 | Hendrey et al. |
| 2002/0107027 A1 | 8/2002 | O'Neil |
| 2002/0108062 A1 | 8/2002 | Nakajima et al. |
| 2002/0111852 A1 | 8/2002 | Levine |
| 2002/0133462 A1 | 9/2002 | Shteyn |
| 2002/0140542 A1 | 10/2002 | Prokoski et al. |
| 2002/0156677 A1 | 10/2002 | Peters et al. |
| 2002/0169713 A1 | 11/2002 | Chang et al. |
| 2002/0198777 A1 | 12/2002 | Yuasa |
| 2003/0006911 A1 | 1/2003 | Smith et al. |
| 2003/0058261 A1 | 3/2003 | Challa et al. |
| 2003/0061163 A1 | 3/2003 | Durfield |
| 2003/0061211 A1 | 3/2003 | Shultz et al. |
| 2003/0105707 A1 | 6/2003 | Audebert et al. |
| 2003/0120502 A1 | 6/2003 | Robb et al. |

(56) References Cited

U.S. PATENT DOCUMENTS

| | | |
|---|---|---|
| 2003/0126095 A1 | 7/2003 | Allen |
| 2003/0135463 A1 | 7/2003 | Brown et al. |
| 2003/0154126 A1 | 8/2003 | Gehlot et al. |
| 2003/0163359 A1 | 8/2003 | Kanesaka |
| 2003/0182191 A1 | 9/2003 | Oliver et al. |
| 2003/0201500 A1 | 10/2003 | Furukawa et al. |
| 2003/0208684 A1 | 11/2003 | Camacho et al. |
| 2003/0220843 A1* | 11/2003 | Lam et al. ............... 705/26 |
| 2003/0222134 A1 | 12/2003 | Boyd |
| 2004/0004117 A1 | 1/2004 | Suzuki |
| 2004/0024638 A1 | 2/2004 | Restis |
| 2004/0039691 A1 | 2/2004 | Barratt et al. |
| 2004/0054575 A1 | 3/2004 | Marshall |
| 2004/0064403 A1 | 4/2004 | Hasumi et al. |
| 2004/0078340 A1 | 4/2004 | Evans |
| 2004/0093274 A1 | 5/2004 | Vanska et al. |
| 2004/0103049 A1 | 5/2004 | Kerr |
| 2004/0117254 A1 | 6/2004 | Nemirofsky et al. |
| 2004/0148253 A1 | 7/2004 | Shin et al. |
| 2004/0199470 A1 | 10/2004 | Ferry et al. |
| 2004/0201500 A1 | 10/2004 | Miller et al. |
| 2004/0254848 A1 | 12/2004 | Golan et al. |
| 2004/0254868 A1 | 12/2004 | Kirkland et al. |
| 2005/0027543 A1* | 2/2005 | Labrou et al. ............... 705/1 |
| 2005/0080716 A1 | 4/2005 | Belyi et al. |
| 2005/0091118 A1 | 4/2005 | Fano |
| 2005/0165684 A1 | 7/2005 | Jenson et al. |
| 2005/0199714 A1 | 9/2005 | Brandt et al. |
| 2005/0216337 A1 | 9/2005 | Roberts et al. |
| 2005/0228719 A1 | 10/2005 | Roberts et al. |
| 2006/0004631 A1 | 1/2006 | Roberts et al. |
| 2006/0010231 A1 | 1/2006 | Spector |
| 2006/0043473 A1 | 3/2006 | Eppich |
| 2006/0043474 A1 | 3/2006 | Kenzer et al. |
| 2006/0059110 A1 | 3/2006 | Madhok et al. |
| 2006/0074769 A1 | 4/2006 | Looney et al. |
| 2006/0085260 A1 | 4/2006 | Yamagishi |
| 2006/0089905 A1 | 4/2006 | Song et al. |
| 2006/0111967 A1 | 5/2006 | Forbes |
| 2006/0131385 A1 | 6/2006 | Kim |
| 2006/0136546 A1 | 6/2006 | Trioano et al. |
| 2006/0161435 A1 | 7/2006 | Atef et al. |
| 2006/0161599 A1 | 7/2006 | Rosen |
| 2006/0165060 A1 | 7/2006 | Dua |
| 2006/0200396 A1 | 9/2006 | Satterfield et al. |
| 2006/0202025 A1 | 9/2006 | Calabrese et al. |
| 2006/0219780 A1* | 10/2006 | Swartz et al. ............... 235/383 |
| 2006/0237531 A1 | 10/2006 | Heffez et al. |
| 2006/0253389 A1 | 11/2006 | Hagale et al. |
| 2006/0281439 A1 | 12/2006 | Benco et al. |
| 2007/0011099 A1 | 1/2007 | Sheehan |
| 2007/0034682 A1 | 2/2007 | Williams |
| 2007/0050259 A1 | 3/2007 | Wesley |
| 2007/0084913 A1* | 4/2007 | Weston ............... 235/380 |
| 2007/0094150 A1 | 4/2007 | Yven et al. |
| 2007/0107044 A1 | 5/2007 | Yven et al. |
| 2007/0136131 A1 | 6/2007 | Mankoff |
| 2007/0155402 A1 | 7/2007 | Van Erlach |
| 2007/0162328 A1 | 7/2007 | Reich |
| 2007/0174082 A1* | 7/2007 | Singh ............... 705/1 |
| 2007/0174259 A1 | 7/2007 | Amjadi |
| 2007/0178912 A1 | 8/2007 | Baranowski |
| 2007/0185776 A1 | 8/2007 | Nguyen et al. |
| 2007/0199049 A1* | 8/2007 | Ziebell ............... 726/3 |
| 2007/0226051 A1 | 9/2007 | Addepalli et al. |
| 2007/0250380 A1 | 10/2007 | Mankoff |
| 2007/0262136 A1 | 11/2007 | Ou |
| 2007/0288641 A1 | 12/2007 | Lee et al. |
| 2008/0000964 A1 | 1/2008 | Flake et al. |
| 2008/0004950 A1 | 1/2008 | Huang et al. |
| 2008/0052168 A1 | 2/2008 | Peters et al. |
| 2008/0059297 A1 | 3/2008 | Vallier et al. |
| 2008/0103959 A1 | 5/2008 | Carroll et al. |
| 2008/0126145 A1* | 5/2008 | Rackley III et al. ............... 705/7 |
| 2008/0139112 A1 | 6/2008 | Sampath et al. |
| 2008/0139181 A1 | 6/2008 | Lokshin |
| 2008/0147484 A1 | 6/2008 | Davis |
| 2008/0147495 A1 | 6/2008 | Bal et al. |
| 2008/0156870 A1 | 7/2008 | Niedermeyer et al. |
| 2008/0161018 A1 | 7/2008 | Miller et al. |
| 2008/0163257 A1 | 7/2008 | Carlson et al. |
| 2008/0167991 A1 | 7/2008 | Carlson et al. |
| 2008/0182590 A1 | 7/2008 | Ruckart et al. |
| 2008/0183480 A1 | 7/2008 | Carlson et al. |
| 2008/0201310 A1 | 8/2008 | Fitzpatrick et al. |
| 2008/0201321 A1 | 8/2008 | Fitzpatrick et al. |
| 2009/0150272 A1* | 6/2009 | Blythe ............... 705/35 |
| 2010/0082454 A1* | 4/2010 | Narayanaswami et al. ..... 705/27 |

FOREIGN PATENT DOCUMENTS

| | | |
|---|---|---|
| KR | 10-2006-0117091 A | 11/2006 |
| WO | 97/45814 A1 | 4/1997 |
| WO | 99/51038 A2 | 10/1999 |
| WO | 00/03328 A1 | 1/2000 |
| WO | 2007/056449 A2 | 5/2007 |
| WO | 2007/056450 A2 | 5/2007 |

OTHER PUBLICATIONS

U.S. Appl. No. 60/356,861, filed Feb. 12, 2002.
U.S. Appl. No. 60/361,646, filed Mar. 4, 2002.
U.S. Appl. No. 12/491,139, filed Jun. 24, 2009.
Search/Examination Report dated Feb. 24, 2010 for International Application No. PCT/US2009/048780, 11 pages.
Supplementary European Search Report issued Apr. 12, 2012, for European Application No. 097711010.4, 11 pages.

* cited by examiner

МОБILE ALERT TRANSACTION SYSTEM
AND METHOD

CROSS-REFERENCES TO RELATED
APPLICATIONS

The present application is a continuation application of and claims priority to U.S. patent application Ser. No. 12/491,125, filed on Jun. 24, 2009, and claims priority to U.S. Provisional Application No. 61/076,099, filed on Jun. 26, 2008, the entire contents of which are herein incorporated by reference for all purposes.

BACKGROUND

There are many occasions where a consumer may want to be notified when his credit card or the like is used. For example, he may want to know when his credit card account number has been used to purchase a large screen television for $5000 on the Internet, when the account number is used outside the U.S. to purchase airplane tickets, or when his child uses the account number or credit card to purchase alcohol.

A consumer may be notified by the issuer that issued his credit card when the issuer determines a potentially fraudulent activity has occurred in a purchase with the consumer's credit card. The issuer may contact the consumer using the contact information it has on file for the consumer, which is typically a consumer's home phone and address. For example, the issuer may call the consumer at his home phone number or send a letter to his home address informing the consumer that potentially fraudulent or unauthorized activity is taking place. However, the consumer may not be at home or may not answer the phone and a letter may take a few days to arrive at the consumer's home. Further, the activity may occur in the early hours of the morning outside of the issuer's business hours and when the consumer does not want to receive a call. For example, if a potentially fraudulent purchase is made with the consumer's credit card at 2 a.m. in the morning, the consumer may be asleep. Thus, conventional notification methods may not be very effective for notifying the consumer of potentially fraudulent or unauthorized credit card activity.

Embodiments of the invention address these and other problems individually and collectively.

BRIEF SUMMARY

Embodiments of the invention are directed to improved consumer notification systems and methods. In particular, a method and system for providing geographic location notifications of payment transactions is disclosed.

One embodiment of the invention is directed to a method comprising receiving an authorization request message associated with a transaction, where the transaction is associated with a portable consumer device and an access device at a merchant. A geographic location of the transaction is determined. It is determined whether a notification message indicating that the transaction is occurring is required. Upon determining that the notification message is required, the notification message is sent to a notification device operated by a consumer and the notification device receives the notification message substantially simultaneously with the merchant's receipt of an authorization response message. A graphical depiction of the notification message is displayed on a map on the notification device.

Another embodiment of the invention is directed to a notification device having a processor, an antenna coupled to the processor, and a computer readable medium coupled to the processor, the computer readable medium comprising code executable by the processor, the code comprising code for receiving a notification message, and code for generating a map comprising a graphical depiction of the notification message associated with a transaction conducted with a portable consumer device and an access device at a merchant, wherein the notification message is received by the notification device substantially simultaneously with the receipt of an authorization request message by the merchant.

Another embodiment of the invention is directed to system that includes a payment processing network which is configured to receive an authorization request message associated with a transaction, the transaction associated with a portable consumer device and an access device at a merchant, and which is also configured to determine a geographic location of the transaction. The system also includes a notification module, coupled to the payment processing network, and which is configured to determine whether a notification message indicating that the transaction is occurring is required. The system further includes an aggregator, coupled to the notification module, and which is configured to send the notification message to a notification device operated by a consumer, upon determining that the notification message is required, wherein a graphical depiction of the notification message is displayed on a map on the notification device, the notification device receives the notification message substantially simultaneously with the receipt of an authorization response message by the merchant.

Yet another embodiment of the invention is directed to a machine-readable storage medium storing a sequence of instructions execution of which causes a processor to provide notifications of payment transactions, the execution of the sequence of instructions causes the processor to perform the actions of: receiving an authorization request message associated with a transaction, the transaction associated with a portable consumer device and an access device at a merchant, determining a geographic location of the transaction, determining whether a notification message indicating that the transaction is occurring is required, and sending the notification message to a notification device operated by a consumer, upon determining that the notification message is required, wherein a graphical depiction of the notification message is displayed on a map on the notification device, the notification device receives the notification message substantially simultaneously with the receipt of an authorization response message by the merchant.

Other embodiments of the invention are directed to computer readable media comprising code for performing the above-described methods as well as systems, apparatuses and devices that perform the methods and/or that use the computer readable media.

These and other embodiments of the invention are described in further detail below.

DETAILED DESCRIPTION

Figure 1A:
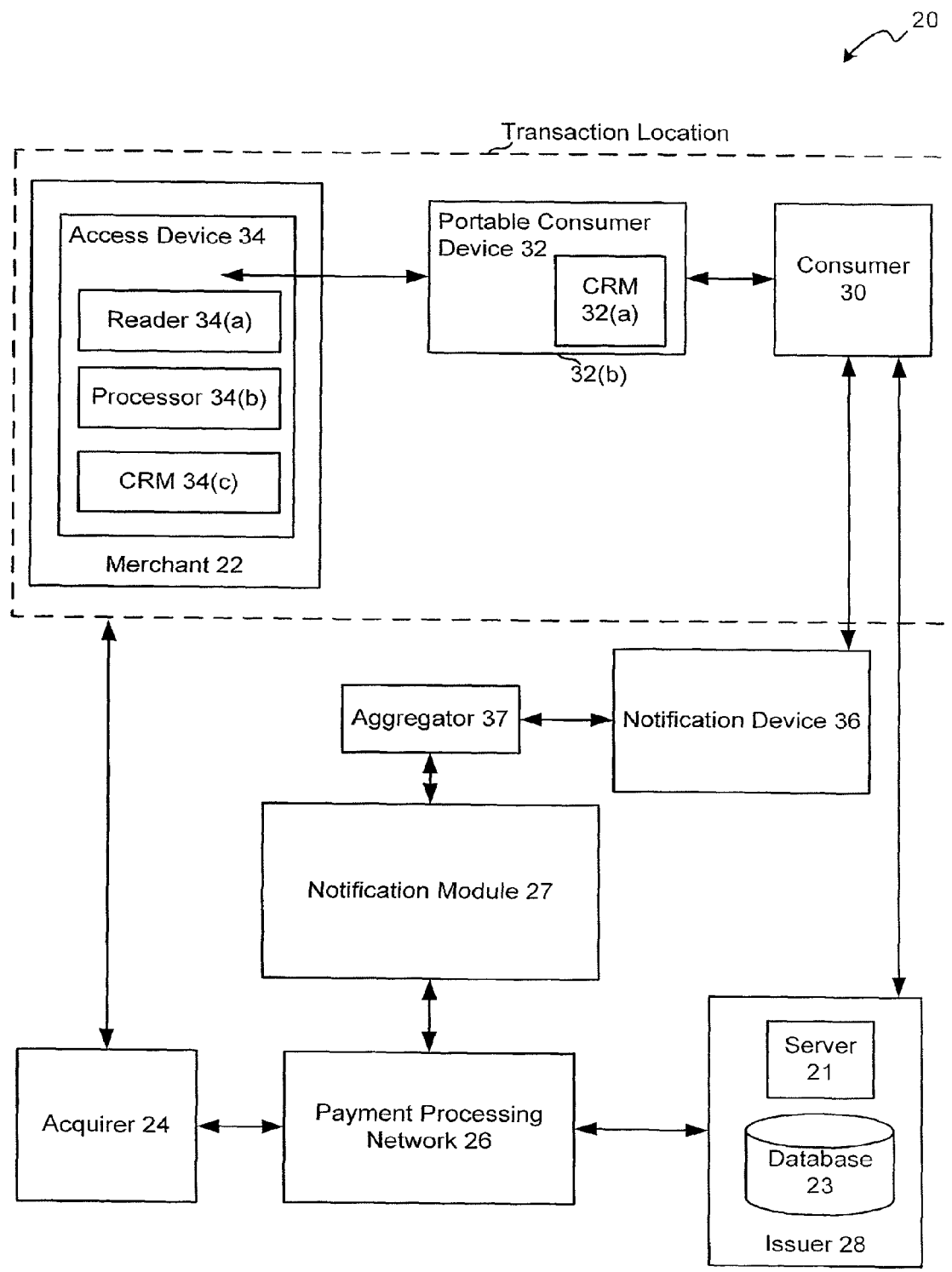
FIG. 1A is a block diagram of a payment processing system according to an embodiment of the invention.

Embodiments of the invention are directed to a method of providing notifications of transactions where a graphical depiction of the notification is displayed on a map on a consumer's notification device. The notification device may receive the notification message substantially simultaneously with a merchant receiving an authorization response message. More specifically, a notification is triggered upon detection of a notification event based on a transaction. Once triggered, a notification is generated and delivered to the notification device if the consumer is enrolled to receive the notification. Map information (i.e., geographic location of the transaction) is determined and is used to enable the display of the notification on the map of the consumer's notification device.

Certain embodiments of the invention may provide one or more technical advantages to issuers and consumers. One technical advantage to a consumer may be knowing the geographic location (geo-location) of a transaction. As described herein, a consumer is provided with notifications that include graphic representations of a geo-location of a transaction. For example, a map with a carrot or icon that points to the exact location of the transaction (i.e., a POS device) may be provided. The visual depiction of the location of the transaction provides the consumer with meaningful information. There is a better chance of the consumer to detect a potentially fraudulent act using the map.

Another advantage is the timeliness of the notification. Notifications may be sent to the consumer as soon as a request for authorization of a transaction is received from a merchant. There is no need to wait until the authorization request message is processed before sending the notification. In other words, the notification may be sent while the transaction is being processed, i.e., before generation of an authorization response message and before clearing and settlement. This also allows a better chance of detecting a potentially fraudulent act because the consumer will likely receive the notification in a timely manner so that he can respond to the notification if necessary. In other embodiments, the notification may be sent after the transaction is processed.

Yet another advantage is the ability to take immediate action on the notification. Actions to be performed on a notification may include one or more of the following: set fraud risk, disable card, dispute transaction, provide more information about the notification, claim a transaction, send a message to a group about a notification, and forward a notification to an application. The actions may then be immediately acted upon by the payment processing network. A graphical user interface (GUI) may provide these action options to the consumer thus allowing the consumer to act upon the notification quickly and easily. The consumer need only select an action and the payment processing system immediately fulfills the action. In contrast, typical systems require the consumer to perform multiple steps before an action can be fulfilled. For example, prior systems require the consumer to access a website of the payment processing network and fill-out a lengthy form in order to initiate a process by which a transaction can be disputed. By providing the action options to the consumer directly, delay in the consumer's response to a notification can be greatly minimized which increases the likelihood of stopping fraudulent activities.

Further, the consumer can also track activity of a child or spouse using the portable consumer device. A technical advantage to an issuer may be that automatic notifications are sent to consumers and the issuer does not have to provide notifications by other means.

Certain embodiments of the invention may include none, some, or all of the above technical advantages. One or more other technical advantages may be readily apparent to one skilled in the art from the figures, descriptions, and claims included herein.

The systems and methods as described herein may be used in the context of payment transactions using payment processing systems, which are configured to process credit and debit card transactions. Further, embodiments of the invention are directed to the use of notification devices, and methods and systems that use them. The notification devices can be used in payment processing systems like those shown in FIG. 1(a).

I. Transaction Notification System and Method for Providing Geo-Location Notifications FIG. 1(a) is a system 20 that can be used in an embodiment of the invention. For simplicity of illustration, one merchant, one issuer, one acquirer, one portable consumer device, one notification device, and one consumer are shown. It is understood however, that embodiments of the invention may include multiple merchants, issuers, acquirers, portable consumer devices, notification devices, and/or consumers. In addition, some embodiments of the invention may include fewer than all of the components shown in FIG. 1(a). Also, the components in FIG. 1(a) may communicate via any suitable communication medium (including the Internet), using any suitable communication protocol.

The system 20 includes a merchant 22 and an acquirer 24 associated with the merchant 22. In a typical payment transaction, a consumer 30 may purchase goods or services at the merchant 22 using a portable consumer device 32, such as a credit card. The payment transaction may occur at one or more transaction locations involving merchant 22, portable consumer device 32, and consumer 30. The acquirer 24 can communicate with an issuer 28 via a payment processing network 26, which provides the acquirer 24 with a transaction authorization response. The payment processing network 26 can also communicate with a notification device 36 via a notification module 27, which provides near real-time transaction notifications.

The acquirer 24 is typically a bank that has a merchant account. The issuer 28 may also be a bank, but could also be business entity such as a retail store. Some entities are both acquirers and issuers, and embodiments of the invention include such entities. The issuer 28 may operate a server computer 21, which may have a computer readable medium comprising code for performing the functions that the issuer 28 performs. A database 23 comprising account number information and other information may be operatively coupled to the server computer 21.

The consumer 30 may be an individual, or an organization such as a business that is capable of purchasing goods or services. In one embodiment, consumer 30 may be one or more individuals who are authorized to use portable consumer device 32.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular or mobile phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The portable consumer device 32 may comprise a computer readable medium (CRM) 32(*a*) and a body 32(*b*). The computer readable medium 32(*a*) may be on the body 32(*b*). The body 32(*b*) may in the form a plastic substrate, housing, or other structure. The computer readable medium 32(*a*) may be a memory that stores data and may be in any suitable form. Exemplary computer readable media 32(*a*) may be in any suitable form including a magnetic stripe, a memory chip, etc. If the portable consumer device 32 is in the form of a card, it may have an embossed region 32(*a*) which is embossed with a PAN (primary account number).

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A "server computer" or "server" is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

The merchant 22 may also have, or may receive communications from, an access device 34 that can interact with the portable consumer device 32. In FIG. 1(*a*), the access device 34 is located at the merchant 22. However, it could be located at any other suitable location in other embodiments of the invention.

The access devices according to embodiments of the invention can be in any suitable form. Examples of access devices include point of sale (POS) devices, cellular or mobile phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may include a reader 34(*a*), a processor 34(*b*) and a computer readable medium 34(*c*). The reader 34(*a*) may include any suitable contact or contactless mode of operation. For example, exemplary card readers can include RF (radio frequency) antennas, magnetic stripe readers, etc. to interact with the portable consumer device 32.

System 20 also includes notification module 27 for processing notifications. Notification module 27 may include various subsystems which enroll one or more consumers, such as consumer 30, into a program for receiving transaction notifications and which generate notifications. Notification module 27 is communicatively coupled to payment processing network 26 and an aggregator 37.

Aggregator 37 collects and forwards notifications from notification module 27 to notification device 36. Aggregator 37 may be an entity or organization that receives and transmits messages to a phone, email account, etc. In some cases, wireless telephone companies may be considered aggregators.

Notification device 36 refers to any suitable device for receiving notifications and for providing the notifications to consumer 30. Notifications refer to communications of information relating to a transaction to consumer 30 on a display of notification device 36. As used herein, a notification includes an alert and/or mapping information. An alert is in the form of textual information about a transaction. Mapping information is in the form of a graphical representation of the transaction. Specifically, mapping information includes a map or other graphic representation of a geographic area. Mapping information may also include a location icon (i.e., a carrot, marker, etc.) which is a graphical indication of the transaction location.

Notifications may be in any suitable form and may be delivered by any suitable method. Some examples of notifications include a phone call, a voice message, a voicemail message, a short message service (SMS) message, e.g., a text message, an instant messaging (IM) message, an email message, or a periodically updated display on a device. An exemplary embodiment of a notification is a near real-time credit card charge. The near real-time credit card charge is a communication to notify consumer 30 of a charge associated with a credit card for a transaction.

Figure 1B:
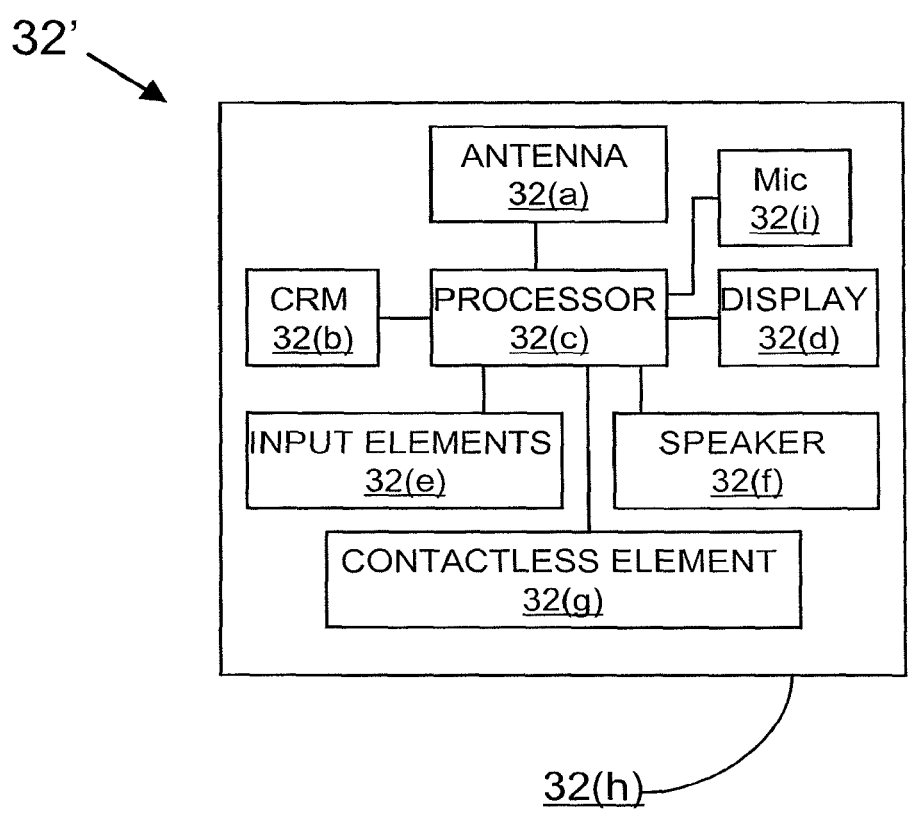
FIG. 1B is a block diagram of an exemplary notification device.

Notification device 36 may be in any suitable form. For example, suitable notification devices 36 can be hand-held and compact so that they can fit into a consumer's wallet and/or pocket (e.g., pocket-sized). Some examples of notification device 36 include mobile phones (e.g., as shown in FIG. 1B), personal digital assistants (PDAs), and the like. In some embodiments, notification device 36 and portable consumer device 30 are embodied in the same device.

In a typical purchase transaction, the consumer 30 purchases a good or service at the merchant 22 using a portable consumer device 32 such as a credit card. The consumer's portable consumer device 32 can interact with an access device 34 such as a POS (point of sale) terminal at the merchant 22. For example, the consumer 30 may swipe a credit card through an appropriate slot in the POS terminal. Alternatively, the POS terminal may be a contactless reader, and the portable consumer device 32 may be a contactless device such as a contactless card.

An authorization request message is then forwarded to the acquirer 24. After receiving the authorization request message, the authorization request message is then sent to the payment processing network 26. The payment processing network 26 then forwards the authorization request message to the issuer 28 of the portable consumer device 32.

After the issuer 28 receives the authorization request message, the issuer 28 sends an authorization response message back to the payment processing network 26 to indicate whether or not the current transaction is authorized. The payment processing network 26 then forwards the authorization response message back to the acquirer 24. The acquirer 24 then sends the response message back to the merchant 22.

After the merchant 22 receives the authorization response message, the access device 34 at the merchant 22 may then provide the authorization response message for the consumer 30. The response message may be displayed by the access device 34 or the portable consumer device 32, or may be printed out on a receipt.

At the end of the day, a normal clearing and settlement process can be conducted by the payment processing network 26. A clearing process is a process of exchanging financial details between and acquirer and an issuer to facilitate posting to a consumer's account and reconciliation of the consumer's settlement position.

In one embodiment, notification module 27 may be triggered by payment processing network 26 to send a notification upon the detection of a notification event. Payment processing network 26 may monitor and detect the notification event at any time after receiving the authorization request message, such as, for example, upon receiving the authorization request message or upon receiving the authorization response message.

Notification events may have any suitable characteristics. In some cases, a notification message (notification) may be triggered by the initiation or completion of a transaction on an account associated with portable consumer device 32. In another example, notifications are triggered by a transaction, such as a transaction initiated by consumer 30 or other suitable entity. For example, a notification may be triggered by using portable consumer device 32 at access device 34 by consumer 30 or by merchant 22 to conduct a transaction. Other examples of notification events based on transactions include the following: a transaction is over a certain amount of money (e.g. over $5000); any transaction conducted with a particular portable consumer device; a spending threshold (e.g., a daily or monthly spending limit) has been reached for a particular portable consumer device; a transaction is made outside a particular geographic location (e.g., outside the country that the consumer resides in, outside a vicinity of the consumer's present location as determined by a geo-location of a device associated with the consumer, etc.); a risky transaction is being conducted ("risky" may be predefined by the consumer and/or the issuer), a transaction is made without the physical portable consumer device (e.g., Internet, mail, or telephone order); a cash transaction or withdrawal; an online account has been accessed to initiate a purchase transaction; a child or spouse has conducted a transaction; a balance on the portable consumer device is exceeded; a particular type of transaction is being conducted (e.g., purchases for airline tickets, lodging, auto rental, restaurants, medical, etc.), etc. Thus, embodiments of the invention are flexible enough to allow for many types of notification events.

Notification module 27 receives trigger information, which may include details of the transaction associated with the notification event and/or details of the notification event. Notification module 27 determines whether consumer 30 should be notified about the notification event, and generates and sends a notification to consumer 30 via aggregator 37 and notification device 36.

Some of the embodiments described below may use a payment processing system like the one described above, or any suitable combination of components in the payment processing system.

FIG. 1B is a block diagram of an exemplary notification device 32'. In one embodiment, notification device 32' is a cellular phone including a body 32(h), computer readable medium ("CRM") 32(b), processor 32(c), display 32(d), input elements 32(e), a contactless element 32(g), antenna 32(a), speaker 32(f), and microphone 32(i).

Body 32(h) may be in the form a plastic substrate, housing, or other structure. CRM 32(b) may be present within body 32(h), or may be detachable from it. Moreover, CRM 32(b) may be a memory that stores data and may be in any suitable form including a memory chip, etc. CRM 32(b) may include code for receiving a notification, wherein the notification indicates that the transaction is occurring, and code for displaying a notification with graphic a representation of a geo-location of the transaction and/or other geo-locations. For example, 32(b) may include code for displaying a map with a location icon (i.e., carrot, marker, etc.) which points to the location of the transaction on the map. Processor 32(c) is in communication with the memory and performs instructions stored therein. Processor 32(c) is connected to display 32(d) and generates a display thereon, such as notifications regarding ongoing or recent transactions associated with a consumer and a map showing the geo-locations of those transactions. Input elements 32(e) are also in communication with the processor for providing inputs to the processor.

Contactless element 32(g) refers to any suitable device for sending and/or receiving wireless signals with information. Contactless element 32(g) may include a contactless transmitter which transmits signals using a near field communications (NFC) and a contactless receiver. Typically, NFC capability is in accordance with a standardized protocol or data transfer mechanism (e.g., ISO 14443/NFC). Some examples of NFC capability are radio-frequency identification (RFID), Bluetooth™, infra-red, and other suitable communications capability. In other embodiments, contactless element 32(g) transmits information via a cellular network.

The notification device 32' may further include antenna 32(a) for wireless data transfer (e.g., data transmission), speaker 32(f) to allow the consumer to hear voice communication, music, etc., and microphone 32(i) to allow the consumer to transmit her voice through the notification device 32'.

II. Infrastructure for Providing Geo-Location Notifications

Embodiments of the invention are directed to geo-location notifications for portable consumer device transactions. In these embodiments of the invention, the system may provide a consumer with a notification about a transaction upon occurrence of a notification event. When the notification is viewed, a notification device of the consumer displays a graphical representation of the notification on a map. For example, a consumer uses a credit card or other portable consumer device to initiate a transaction with a merchant via an access device such as a point of sale ("POS") terminal. The system may provide to a phone or other notification device of the consumer, a notification including an alert, a map and an icon indicating the location of where the transaction is occurring. The visual representation of the transaction location on a map enables the consumer to quickly ascertain whether the transaction is fraudulent in nature. For example, the representation of the geo-location of the transaction may indicate to the consumer that a family member is using the credit card, instead of an unauthorized person.

Figure 2:
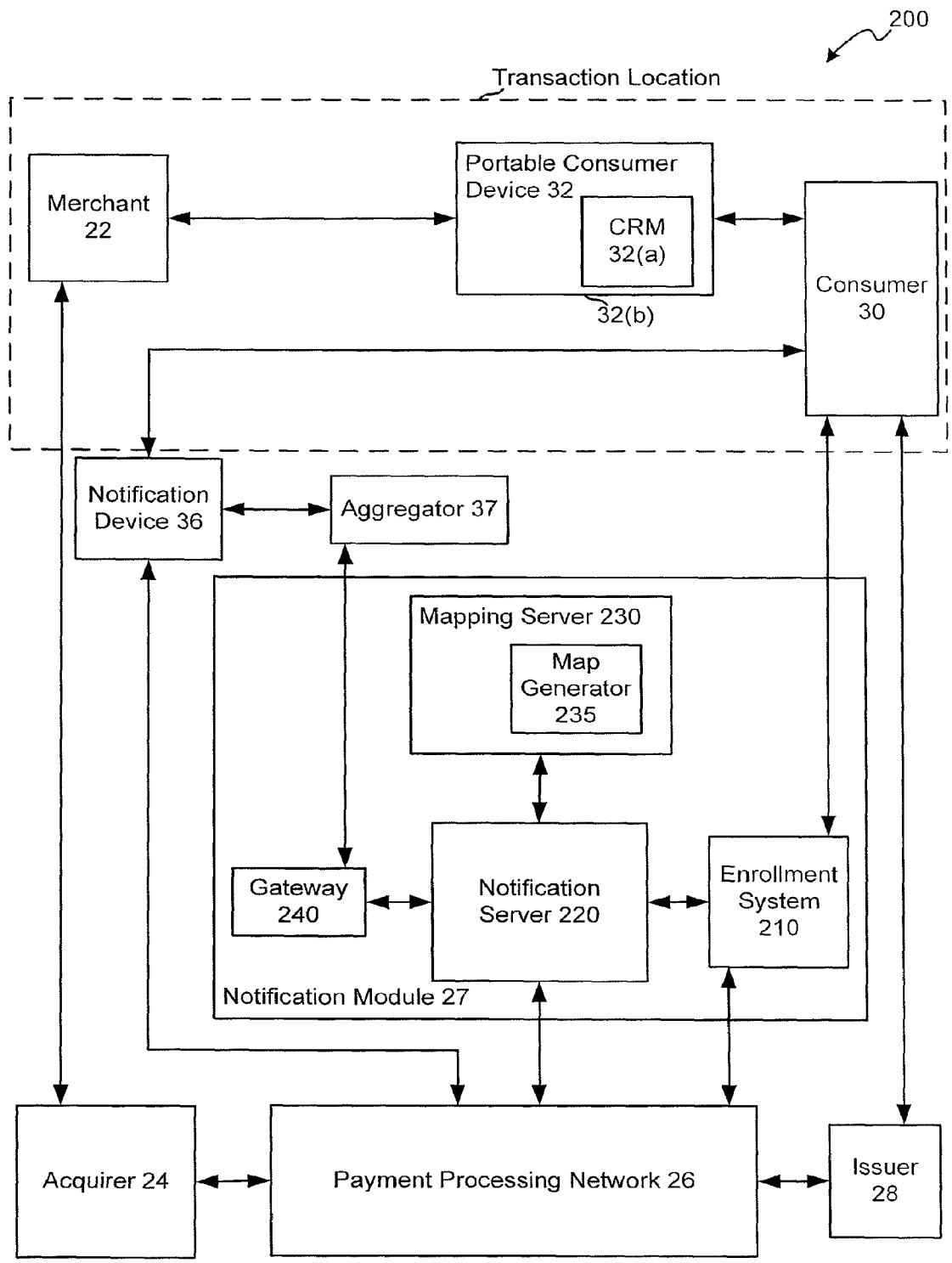
FIG. 2 is a block diagram of a payment processing system according to an embodiment of the invention.

FIG. 2 is a block diagram of payment processing system 200 according to an embodiment of the invention. System 200 includes merchant 22, acquirer 24 associated with the merchant 22, portable consumer device 32, and consumer 30. The acquirer 24 can communicate with an issuer 28 via a payment processing network 26. The payment processing network 26 can also communicate with a notification device 36 via aggregator 37 and notification module 27, which provides near real-time transaction notifications.

Notification module 27 includes an enrollment system 210, a notification server 220, a mapping server 230, and a gateway 240. Enrollment system 210 is in communication with consumer 30, payment processing network 26, and notification server 220. Notification server 220 is also in communication with gateway 240, mapping server 230, and payment processing network 26. Although enrollment system 210 is shown as being separate from issuer 28, enrollment system 210 can be at issuer 28 in some embodiments.

Before a consumer receives notifications, the consumer can register with enrollment system 210. Consumer 30 may register for notifications or update existing notifications for transactions made with the portable consumer device 32 in any number of ways. For example, consumer 30 can register via a separate website designed for this purpose, or manually though a paper form (which may be considered a registration interface). Issuer 28 or payment processing network 26 may also enroll consumer 30 automatically for notifications.

Enrollment system 210 receives enrollment information from consumer 30, for example, via a web interface using a computer, or from issuer 28 and may store the enrollment information in a database. Enrollment system 210 may provide the enrollment information to a system which will be detecting the notification event so that the system knows what events to monitor before a notification is sent to consumer 30. The enrollment information may be provided on demand (e.g., when consumer 30 makes a change), periodically (e.g., hourly, daily, etc.), or an individual request basis, and using a push or pull scheme. In one embodiment, the system detecting the notification event is payment processing network 26. In another embodiment, the system detecting the notification event may be issuer 28.

Enrollment information includes details of notification events that describe the conditions that must take place to trigger notifications, updated enrollment information, and other account information. Consumer 30 may define the notification events when enrolling in a program to receive notifications. In alternative embodiments, the notification events are predetermined by the system, for example, such that consumer 30 can enroll by opting into the notification program within minimal input.

Notification server 220 generates and processes notifications with graphic representations of a geo-location of a transaction and is in communication with payment processing network 26, enrollment server 210, mapping server 230, and gateway 240. Notification server 220 may receive trigger information from payment processing network 26 upon detection of a notification event.

In embodiments of the invention, the notification server 220 and/or a server in the payment processing network 26 may comprise a processor, and a computer readable medium. The computer readable medium may comprise code executable by the processor. The code may comprise (i) code for receiving an authorization request message associated with a transaction, the transaction associated with a portable consumer device and an access device at a merchant, (ii) code for determining a geographic location of the transaction, (iii) code for determining whether a notification message indicating that the transaction is occurring is required, and (iv) code for sending the notification message to a notification device operated by a consumer, upon determining that the notification message is required, wherein a graphical depiction of the notification message is displayed on a map on the notification device, the notification device receives the notification message substantially simultaneously with the receipt of an authorization response message by the merchant. In other words, the notification devices receives the notification message at or near the same time that the merchant receives an authorization response message.

Trigger information may include details of the transaction which satisfied the conditions of a notification event, details of the notification event, and/or other suitable information. Details of the transaction may include a transaction identifier, a location of the transaction (i.e., geo-location of access device 34, merchant 22, portable consumer device 32, and/or consumer 30), transaction amount, the particular type of portable consumer device, the name or other identification of the consumer 30, etc. In another embodiment, trigger information includes an indicator of a risk of fraud, such as a fraud risk score for the transaction. A fraud risk score is a measure of a level of likelihood of fraud for a transaction, merchant, account, etc. Notification module 27 may generate, using the fraud risk indicator, a notification which when viewed provides a graphic representation of the fraud score on the map. For example, a graphical attribute (i.e., color, size, shape, etc.) of a location icon may reflect the risk of fraud. Specifically, the location icon may be displayed to consumer in a red color if the risk of fraud is high.

Notification server 220 may determine whether consumer 30 would like to be notified about the transaction by communicating with enrollment system 210, generate the notification messages, and send the notification messages through gateway 240 to aggregator 37. In other words, notification module 27 determines whether a notification message indicating that the transaction is occurring is required. For example, it is determined whether consumer 30 has enrolled in the notification program and whether the notification event is a type of event that consumer 30 would like to be notified about. Notification messages may then be sent to consumer 30 upon determining that the notification message is required. A geo-location of the transaction from the trigger information is provided to mapping server 230 and mapping information is received. The notification message (notification) may be generated using the alert and/or mapping information. For example, a notification may be generated using only the alert and another notification may be generated with the mapping information.

Mapping server 230 provides mapping information and is in communication with notification server 220. The communication may occur through an appropriately configured network, such as the internet, and one or more private networks, such as a cellular data network. Mapping server 230 may receive a message including geo-location information, interpret the message to extract geo-location information, convert the geo-location information into a common format, and provide mapping information to notification server 220. Mapping information may include a map with a graphic representation of a geo-location of a transaction, such as a map and/or a location icon.

Mapping server 230 includes a map generator 235 which selects map tiles which encompass the geo-location information and generates a location icon to be overlaid on the map in the correct location. In one embodiment, maps are broken-down into smaller components, i.e., map tiles. The location icon is an object on the map that is tied to latitude/longitude coordinates of the map. The location icon may be used to indicate the point in the map representing the geo-location information. For example, if the geo-location of a POS device is provided, map generator may select one or more map tiles and may generate a graphical location icon (i.e., a carrot, marker, etc.) to point to the exact location of the POS device on the map. In one embodiment, the received geo-location information may not only include the location of the transaction, but may also include the location of notification device 36 in the form of a consumer icon. Multiple location icons, such as a consumer icon, may be generated, such that, for example, consumer 30 may visually compare on the map the location of the transaction relative to the current position of the consumer 30 (as determined by a geographic location of notification device 36). Disparate locations may signal a fraudulent transaction.

Notification server 220 may send the notifications through gateway 240 to aggregator 37. Gateway 140 is any suitable device that converts information from the protocol or format used in notification module 27 to those used in aggregator 37. Gateway 260 may be embodied by a computer or a network that allows or controls access to another computer or network. Gateway 260 may also be a software interface between the computer or network and another computer or network. As previously mentioned, aggregator 37 refers to any suitable entity or device that receives notifications, and collects and transmits the notifications to notification device 36 for consumer 30.

As previously mentioned, notification device 36 refers to any suitable device for receiving notifications and for providing the notifications to consumer 30. Notification device 36 may be in communication with payment processing network 26. In one embodiment, where the notification includes the trigger information but does not include the mapping information, notification device 36 may include an interface to enable consumer 30 to select a notification and to send a request for mapping information for the selected notification to notification server 220 via payment processing network 26. Notification device 36 may then receive the requested mapping information from notification server 220 via gateway 240 and aggregator 37.

Figure 3:
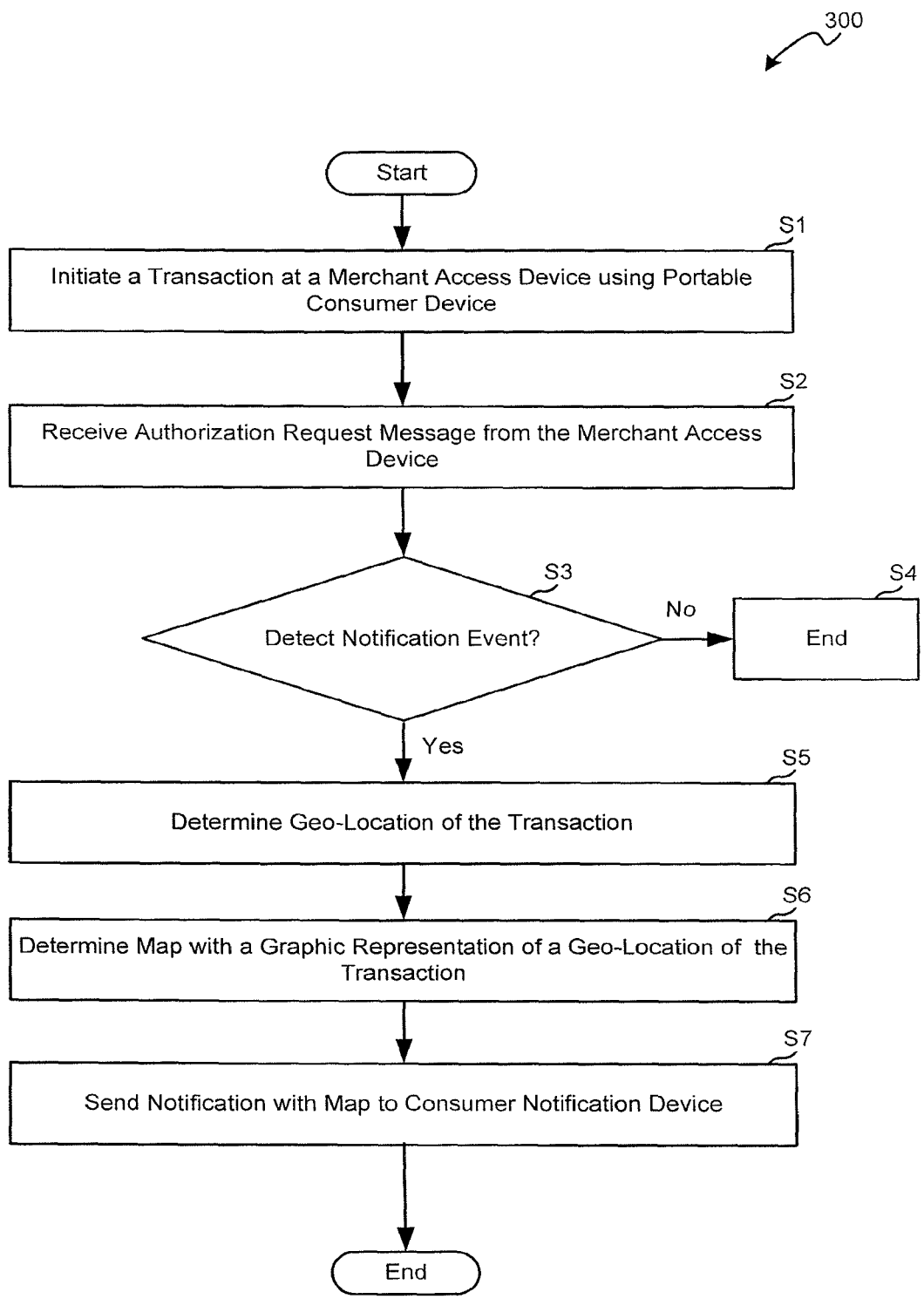
FIG. 3 is a flowchart illustrating steps in a method according to an embodiment of the invention.

FIG. 3 is a flowchart illustrating steps in a method according to an embodiment of the invention. At step S1, consumer 30 uses portable consumer device 32 to initiate a transaction at an access device 34 of merchant 22. Transactions may be initiated in a multitude of ways. For example, the consumer 30 may use a credit card (i.e., portable consumer device) by swiping it through an appropriate slot in a POS terminal (i.e., access device 34).

At step S2, an authorization request message for the transaction is received from the merchant access device. In one embodiment, payment processing network 26 receives the authorization request message for the transaction via acquirer 24.

At step S3, it is determined whether a notification event has been detected, for example after monitoring for the notification event(s). As previously discussed, the detection of a notification event triggers the generation of a notification. For example, payment processing network 26 may detect the notification event and may trigger notification module 27 by sending trigger information.

Typically, payment processing network 26 forwards the authorization request message to the issuer 28, which then indicates in a response message to merchant 22 whether or not the transaction is authorized. In one embodiment, multiple processes and/or threads may be running at payment processing network 26 such that payment processing network 26 can simultaneously determine the authorization status of the transaction and can monitor for and detect notification events (or otherwise trigger the generation of notifications). As such, consumer 30 may receive a notification about a transaction at substantially the same time that merchant 22 receives an authorization response message. Thus, as described herein, notifications are provided to consumers in a timely manner, i.e., while the authorization request message or the transaction is being processed or shortly thereafter. At step S4, if notification events are not detected, processing ends.

Where the notification event has been detected, at step S5, the geo-location of the transaction is determined. In one embodiment, the geo-location of the transaction may be determined by identifying the geo-location of access device 34. This information may be provided in the authorization request message. In another embodiment, the authorization request message may include information identifying merchant 22 or access device 34 which may be used to determine the geo-location of the transaction. In yet another embodiment, the geo-location of consumer 30 or portable consumer device 32 which was used in the transaction may be used for the geo-location of the transaction. The payment processing network 26 may include the geo-location of the transaction in trigger information that is sent to notification module 27.

A map with a graphic representation of a geo-location of the transaction is determined at step S6. Notification module 27 may provide a map of a relative vicinity of the transaction location. The map may also include a location icon, such as a carrot or marker, which points to or otherwise identifies the geo-location of the transaction. For example, the location icon may graphically indicate the particular store from which the authorization request message was sent. In one embodiment, the location icon is embedded within the map. In another embodiment, the location icon is a separate object which is intended to overlay the map and is tied to latitude/longitude coordinates on the map.

At step S7, a notification including the map is sent to a consumer notification device. For example, the notification may be sent to notification device 36 belonging to consumer 30.

Figure 4A:
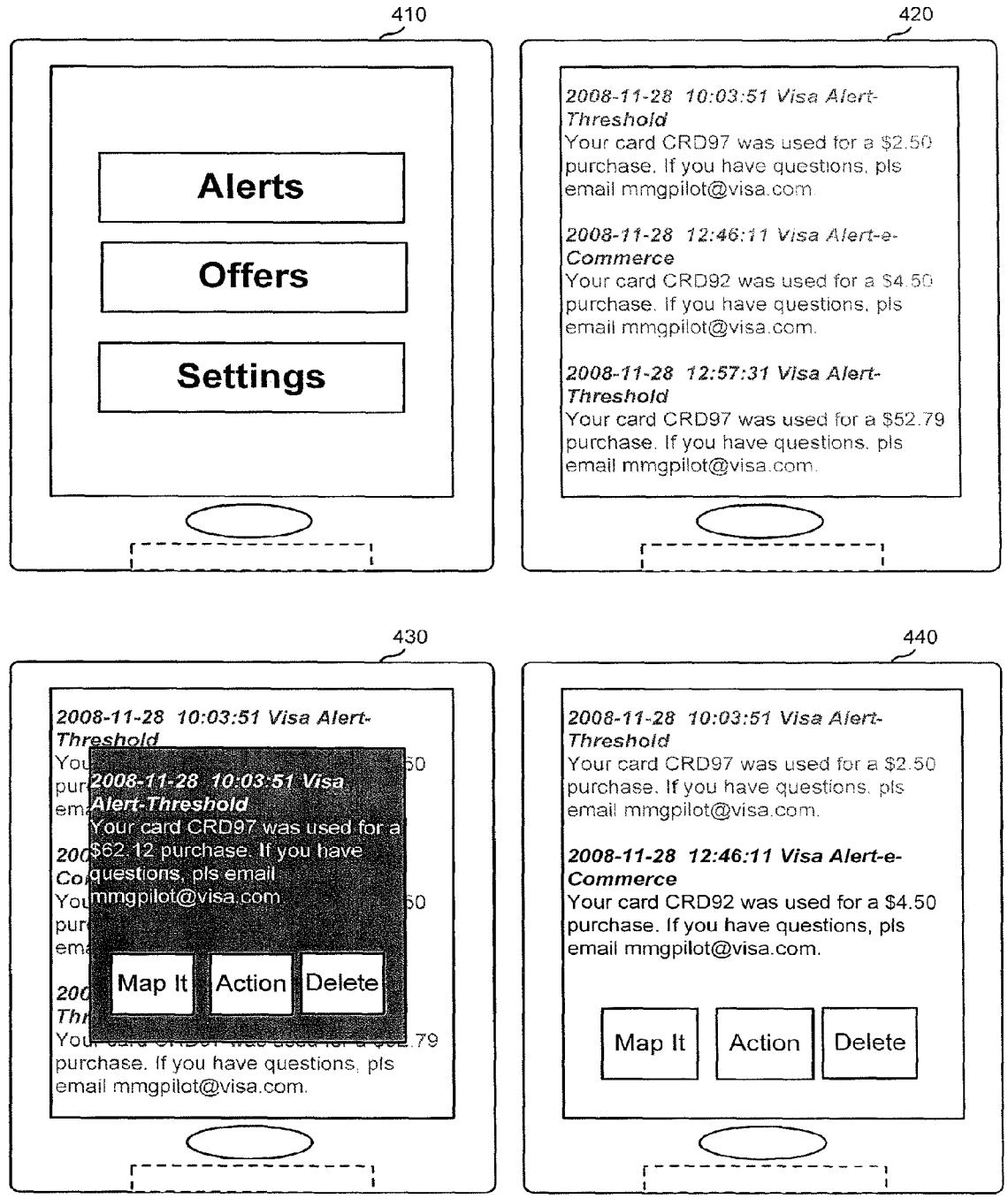
FIG. 4A is a series of schematic drawings of a notification device displaying near-real time notifications according to an embodiment of the invention.

FIG. 4A is a series of schematic drawings of a notification device displaying near-real time notifications according to an embodiment of the invention. Notification device 410 includes a display for displaying an exemplary graphical user interface including an indicator for viewing notifications and an indicator for viewing offers. Notification device 420 includes a display for displaying an exemplary list of notifications. Notification device 430 includes a display for displaying a pop-up window for a new notification. The pop-up window includes a "Map It" indicator for displaying a map of the subject transaction, an "Action" indicator for displaying a list of actions to be taken on the subject transaction, and a "Delete" indicator for deleting the notification.

In one embodiment, the GUI enables a consumer to select a notification from the list of notifications. Where the notifications are associated with financial transactions, the consumer selects a transaction among a list of one or more transactions. The selected notification may be displayed on a map.

Notification device 440 includes a display which illustrates a selected notification. The display further includes a "Map It" indicator for displaying a map of the subject transaction, an "Action" indicator for displaying a list of actions to be taken on the subject transaction, and a "Delete" indicator for deleting the notification.

Figure 4B:
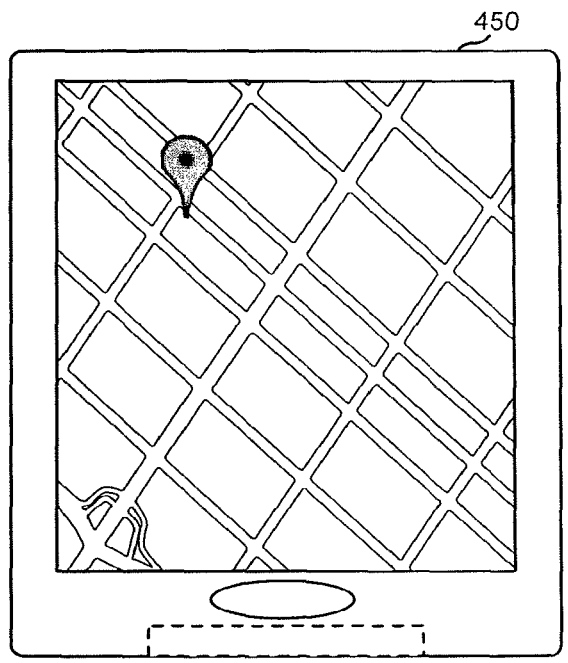
FIG. 4B is a series of schematic drawings of a notification device displaying near-real time notifications with graphic representations of a geo-location of a transaction according to an embodiment of the invention.
Figure 4B:
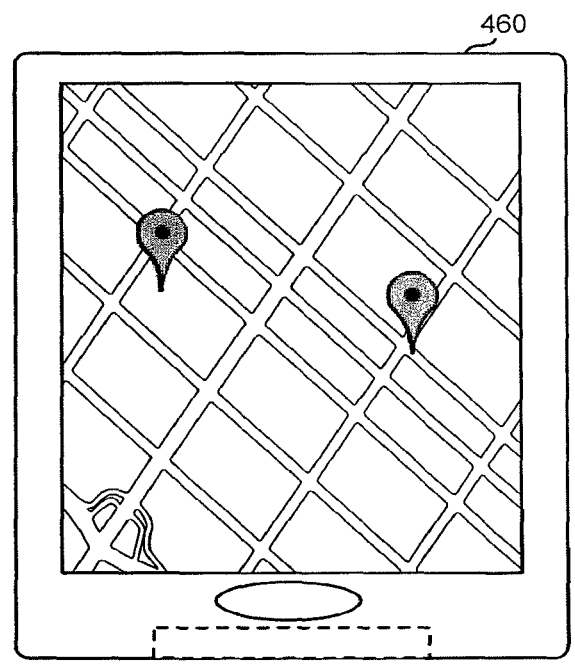

FIG. 4B is a series of schematic drawings of a notification device displaying near-real time notifications with graphic representations of a geo-location of a transaction according to an embodiment of the invention. Notification device 450 includes a display for displaying an exemplary map with a graphic representation of a geo-location of the selected notification.

Maps may include multiple location icons indicating not only the most recent transaction location, but also any previous transaction locations, and a consumer's present location. For example, a consumer may select one or more notifications from a list for mapping. The map, as shown in notification device 460, includes carrots indicating the transaction locations of the selected notifications. Also included is a carrot showing the consumer's present location, as determined for example by a GPS location of the notification device 460.

III. Notification Infrastructure Supporting Actions to be Performed on a Notification In addition to providing near-real time notifications for transactions, methods and systems as described herein enable consumers to act on those notifications quickly and easily. For example, consumers may select actions to be performed on a notification (and/or associated transaction) after receiving the notification on a PDA. A GUI may be provided to the consumer including a list of selectable actions. Actions to be performed on a notification may include one or more of the following: set fraud risk, disable card, dispute transaction, provide more information about the notification, claim a transaction, send a message to a group about a notification, and forward a notification to an application.

In one embodiment, the actions may be customized. For example, actions may be context-specific and/or consumer-specific. Consumer 30 enrolls in the program to receive notifications on notification device 36. Consumer 30 may send enrollment information to enrollment system 20. The enrollment information may specify the types of actions that consumer 30 would like to enable. Actions may be specified in various ways. Actions may be specified based on any attribute/characteristic of a transaction. For example, consumer 30 may set actions to be performed for all transaction types. In another embodiment, one set of actions may be set out for POS transactions and another set of actions may be set out for e-Commerce transactions. In an alternative embodiment, a default set of actions may be provided.

Customized actions may be determined by notification module 27 and communicated to notification device 36. For example, when notification module 27 is triggered to generate a notification, notification server 220 may determine from enrollment system 210 one or more customized actions associated with a transaction and may embed a list of the customized actions within the notification itself.

Figure 5:
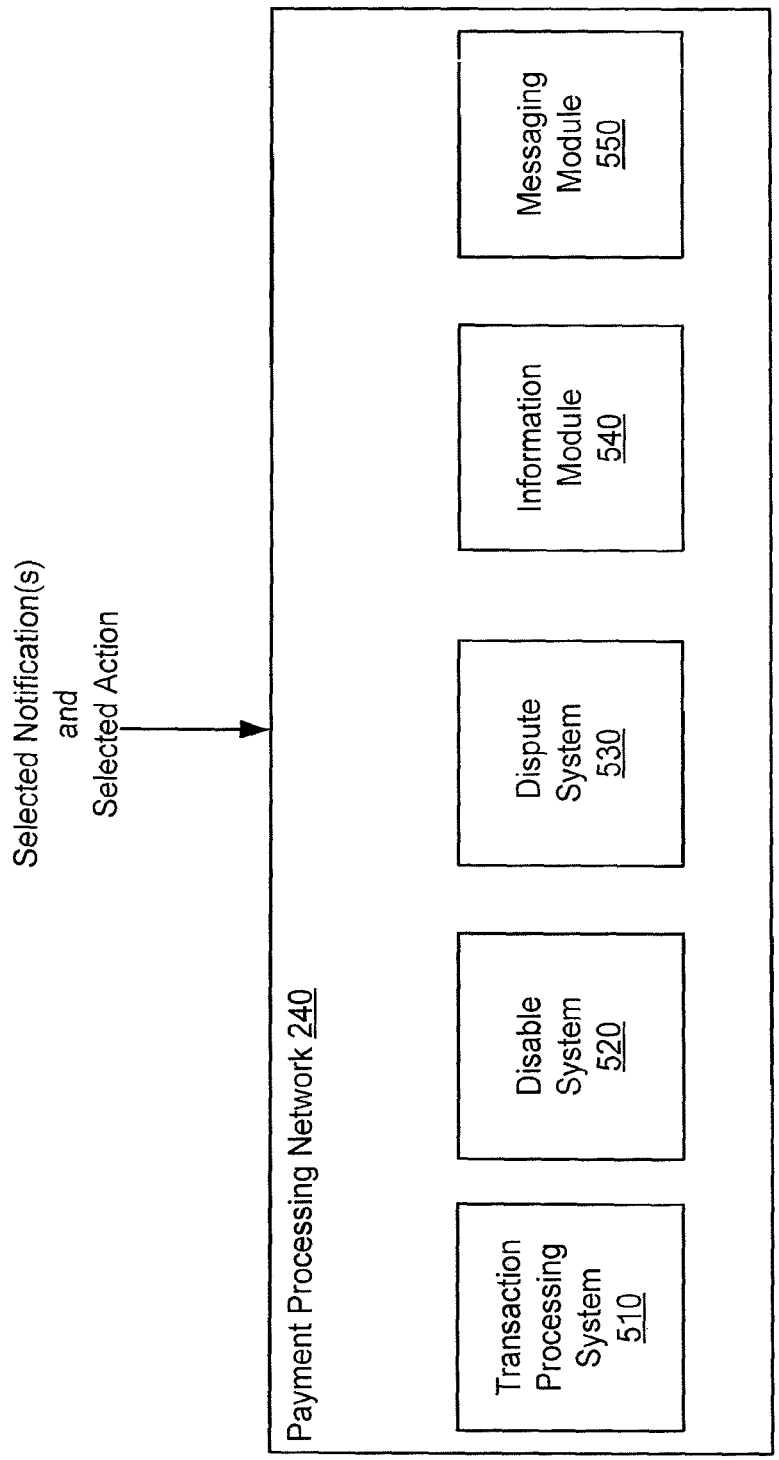
FIG. 5 is a block diagram of a payment processing network according to an embodiment of the invention.

FIG. 5 is a block diagram of a payment processing network according to an embodiment of the invention. Consumer 30 may receive a notification via notification device 36 in the manner described above. Through a GUI of notification device 36, consumer 30 may then select one or more notifications upon which a selected action will be performed. Payment processing network 240, which is in communication with notification device 36, receives the selected notification(s) and the selected action. The selected notification(s) and selected action are distributed to an appropriate system/module based on the action selected.

A fraud risk score/level is a measure of a level of likelihood of fraud for a transaction, merchant, account, etc. It may be desirable to allow a consumer to set a fraud level immediately after receiving a notification. For example, consumer 30 may receive a notification that her credit card is being used for a transaction in a distant foreign land known for fraudulent activity. Consumer 30 may select the "set fraud risk" action to be applied to one or more selected notifications. Payment processing network 240 may distribute the action and selected notifications to transaction processing system 510 for fulfillment, which then associates the selected fraud level with the transaction.

Upon receipt of a "disable card" action to be applied to one or more selected notifications, payment processing network 240 may distribute the action and selected notifications to disable system 520 for fulfillment, which may disable the portable consumer device associated with the transaction. Upon receipt of a "dispute" action to be applied to one or more selected notifications, payment processing network 240 may distribute the action and selected notifications to dispute system 520 for fulfillment, which may activate channels to dispute the transaction.

Consumers often require additional information about a transaction in order to recognize the transaction as being valid or fraudulent. As such consumer 30 may have the option of making a request for more information. Upon receipt of a "More Info" action to be applied to one or more selected notifications, payment processing network 240 may distribute the action and selected notifications to information module 520 for fulfillment. Information module 520 may provide additional information to consumer 30 via payment processing network 26.

A single portable consumer device may be associated with multiple authorized consumers. For example, a child or spouse may also have access to a credit card in addition to a primary consumer. A primary consumer may wish to monitor the spending among the multiple authorized consumers. In one embodiment, notifications can be sent to all authorized consumers or any subset thereof (i.e., a primary consumer) whereby authorized consumers can claim ownership of a transaction. In other words, one authorized consumer of a plurality of authorized consumers can identify themselves as the source or initiator of the transaction. Upon receipt of a "Claim Transaction" action to be applied to one or more selected notifications, payment processing network 240 may distribute the action and selected notifications to transaction processing system 510 for fulfillment. It is further contemplated that a monthly statement may identify the consumer who claimed the transaction. Analytics may also be provided in the monthly statement, for example, identifying the total spending for the statement period by each consumer authorized to use the credit card account. The details of setting out the recipients of notifications and identifying the analytics format of a monthly statement may be configurable during the enrollment process with enrollment system 210.

Furthermore, consumers may like to send messages to other members of a group (i.e., other authorized consumers) about the transaction. As such, an email, text message, SMS message, or other message may be automatically created. The message may include a pre-determined list of recipients and may also include the contents of the selected notification. Upon receipt of a "Send Message to Group" action to be applied to one or more selected notifications, payment processing network 240 may distribute the action and selected notifications to messaging module 550 for fulfillment. The details of setting out the recipients of these messages may be configurable during the enrollment process with enrollment system 210.

Many consumers maintain their own records of their spending habits, for example, using an Excel™ spreadsheet or Quicken®, or other personal finance software. Consumers may wish to format the notifications quickly and easily. Upon receipt of a "Forward to Application" action to be applied to one or more selected notifications, payment processing network 240 may distribute the action and selected notifications to messaging module 550 for fulfillment, whereby the selected notifications are formatted and sent as a message according to the consumer's preferences. The details of setting out the formatting options, recipients, and messaging preferences may be configurable during the enrollment process with enrollment system 210. For example, the notification message may be provided in an application-specific format. An enrollment profile of the consumer may specify various consumer-preferred application formats. The GUI may provide one or more indicators for the one or more application formats. The consumer may select a particular application format using the indicators. The notification message is formatted accordingly and is provided to the consumer or specified destination.

Figure 6:
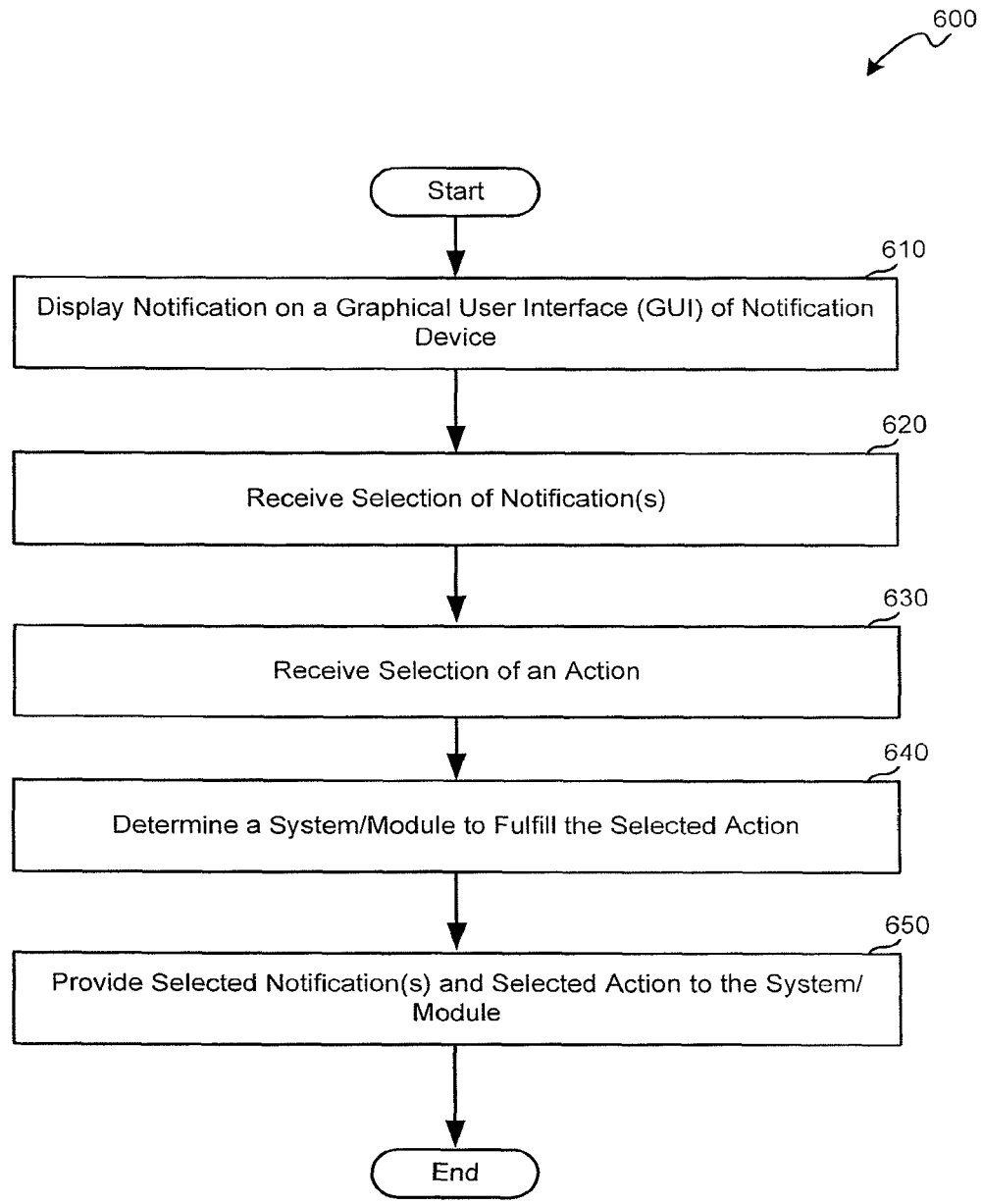
FIG. 6 is a flowchart illustrating steps for implementing consumer-selected actions which are associated with one or more selected notifications according to an embodiment of the invention.

FIG. 6 is a flowchart illustrating steps for implementing consumer-selected actions which are associated with one or more selected notifications according to an embodiment of the invention. In a typical transaction a consumer 30 may use portable consumer device 32 to make a purchase via a payment processing network 26. For example, consumer 30 may use a portable consumer device, such as a credit card, to pay $5000 for a flat screen television. Consumer 30 may receive a notification of the transaction on her PDA, or other notification device 36. At step 610, the notification is displayed on a GUI of notification device 36.

Through the GUI of notification device 36, consumer 30 may select one or more received notifications and an action to be applied to the selected notifications. Notification device 36 may receive these selections in steps 620 and 630.

At step 640, a system or module to fulfill the selected action is determined and at step 650, the selected notification(s) and the selected action are provided to the system or module for fulfillment. In one embodiment, payment processing network 26 distributes the selected notification(s) to a system or module based on the action selected. Other methods of distribution are also contemplated.

Figure 7A:
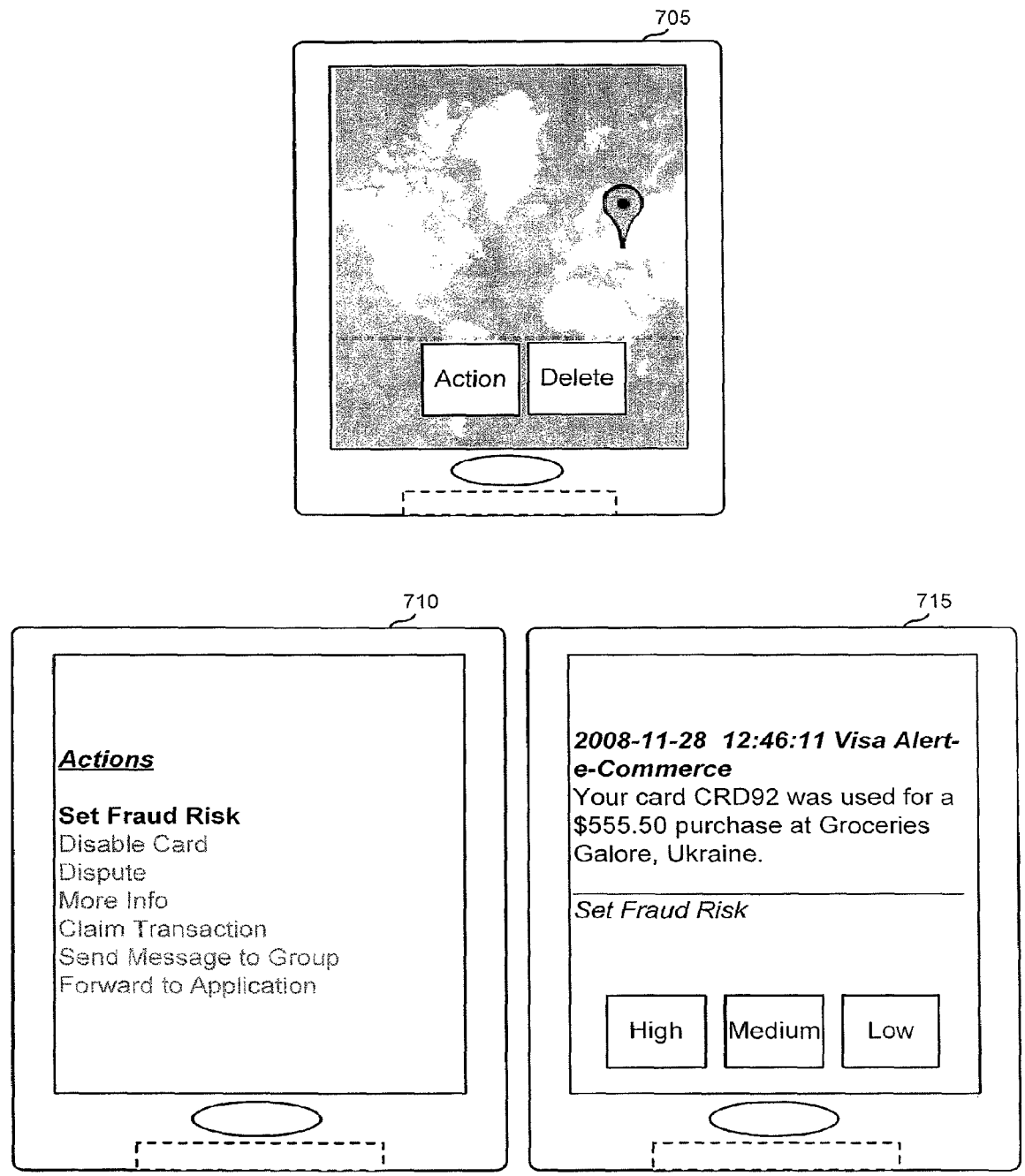
FIG. 7A is a series of schematic drawings of a notification device displaying a fraud risk action according to an embodiment of the invention.

FIG. 7A is a series of schematic drawings of a notification device displaying a fraud risk action according to an embodiment of the invention. In one embodiment, consumer 30 receives a notification about a transaction and views the map, as shown on the display of notification device 705. The map includes a graphic representation of the geo-location of the selected notification. For example, a map of a city in Ukraine is shown as the location of the transaction. Notification device 705 also includes an "Action" indicator for displaying a list of actions to be taken on the subject transaction and a "Delete" indicator for deleting the notification.

Notification device 710 includes a display for showing an exemplary list of actions that may be performed on the selected notification. As previously mentioned, the actions may be customized or otherwise context-specific. The actions may include; "Set Fraud Risk," "Disable Card," "Dispute" transaction, "More Info," "Claim Transaction," "Send Message to Group," and "Forward to Application." As shown, the "Set Fraud Risk" action is selected.

Notification device 715 includes a display showing the selected notification on the upper portion of the display. The display provides multiple indicators for enabling a consumer to set the level of fraud risk (i.e., fraud level) of the selected transaction. As shown, a "High" indicator, a "Medium" indicator, and a "Low" indicator are provided. Other methods for enabling a consumer to set the fraud level are also contemplated. For example, consumers may provide a number (for example on a scale of 1 thru 10) that represents a fraud risk score.

Figure 7B:
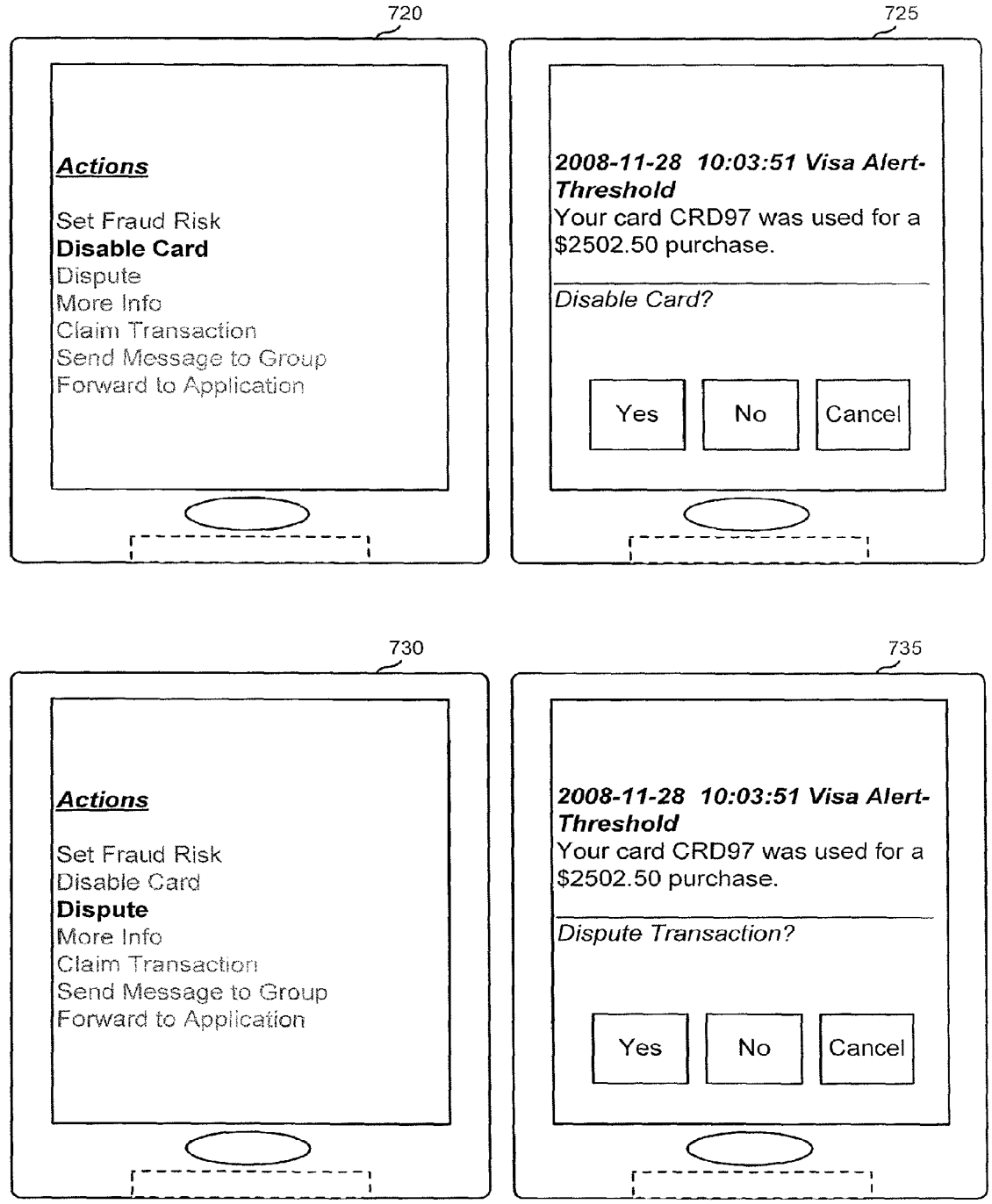
FIG. 7B is a series of schematic drawings of a notification device displaying a disable action and a dispute action according to an embodiment of the invention.

FIG. 7B is a series of schematic drawings of a notification device displaying a disable action and a dispute action according to an embodiment of the invention. Notification device 720 includes a display for showing an exemplary list of actions that may be performed on the selected notification. As shown, the "Disable Card" action is selected.

Notification device 725 includes a display showing the selected notification on the upper portion of the display. The display provides indicators for enabling a consumer to disable a credit card or otherwise disable an account. As shown, a "Yes" indicator, a "No" indicator, and a "Cancel" indicator are provided. Selection of the "Yes" indicator may cause notification device 725 to send a request to payment processing network 26 to disable the card associated with the selected notification.

Notification device 730 includes a display for showing an exemplary list of actions that may be performed on the selected notification. As shown, the "Dispute" action is selected.

Notification device 735 includes a display showing the selected notification on the upper portion of the display. The display provides indicators for enabling a consumer to dispute a transaction associated with the selected notification. As shown, a "Yes" indicator, a "No" indicator, and a "Cancel" indicator are provided. Selection of the "Yes" indicator may cause notification device 725 to send a request to payment processing network 26 to dispute the transaction associated with the selected notification.

Figure 7C:
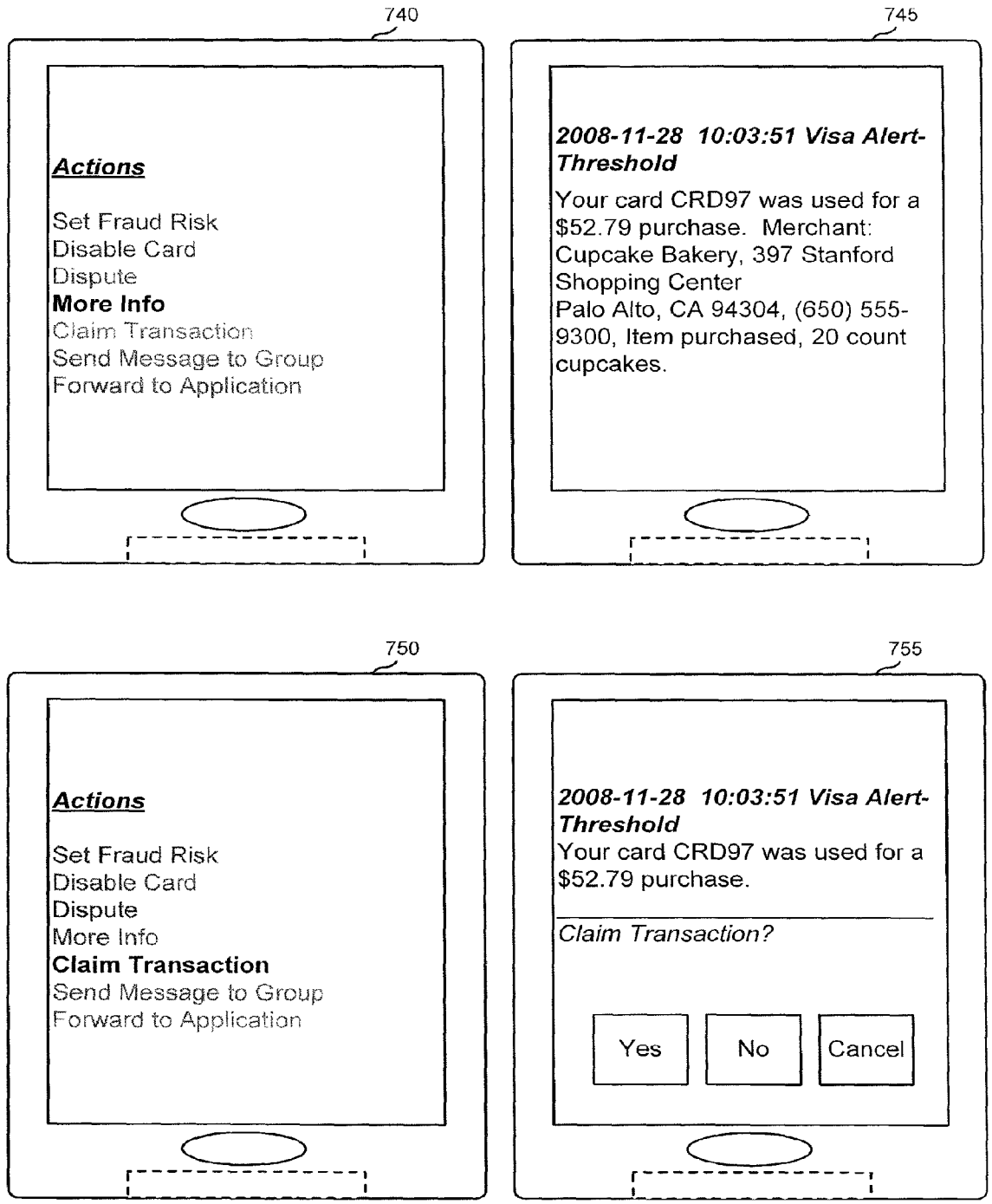
FIG. 7C is a series of schematic drawings of a notification device displaying additional actions according to an embodiment of the invention.

FIG. 7C is a series of schematic drawings of a notification device displaying additional actions according to an embodiment of the invention. Notification device 740 includes a display for showing an exemplary list of actions that may be performed on the selected notification. As shown, the "More Info" action is selected. Notification device 745 includes a display showing additional information about the transaction associated with the selected notification.

Notification device 750 includes a display for showing an exemplary list of actions that may be performed on the selected notification. As shown, the "Claim Transaction" action is selected.

Notification device 755 includes a display showing the selected notification on the upper portion of the display. The display provides indicators for enabling a consumer to claim a transaction as their own. In other words, consumers can identify themselves as the source or initiator of the transaction. As shown, a "Yes" indicator, a "No" indicator, and a "Cancel" indicator are provided. Selection of the "Yes" indicator may cause notification device 755 to send a request to payment processing network 26 to couple the consumer with the transaction associated with the selected notification. Likewise, selection of the "No" indicator may cause notification device 755 to send a request to payment processing network 26 to de-couple the consumer with the transaction associated with the selected notification.

Figure 7D:
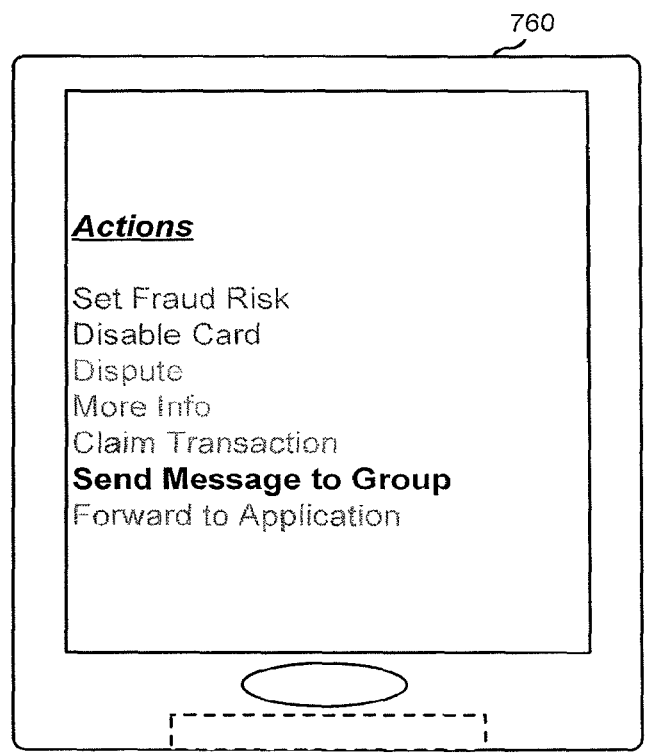
FIG. 7D is a series of schematic drawings of a notification device displaying further actions according to an embodiment of the invention.
Figure 7D:
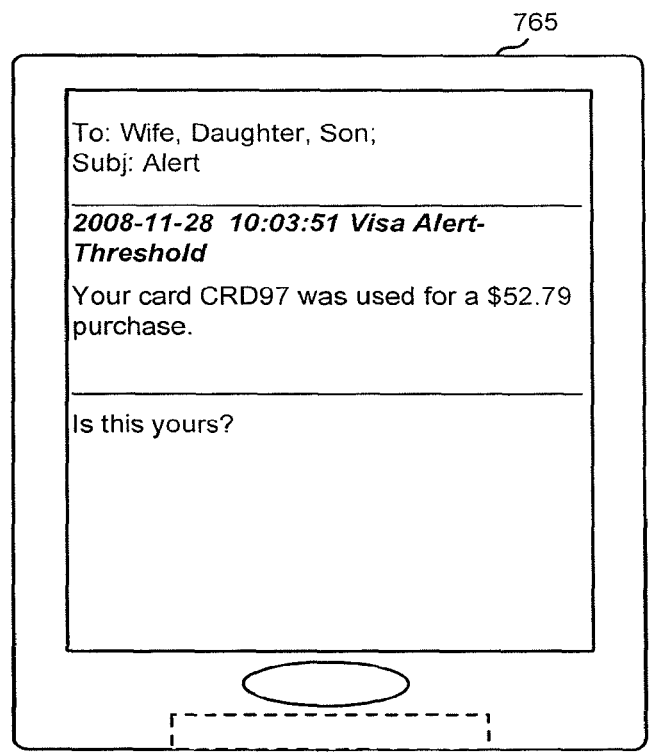

FIG. 7D is a series of schematic drawings of a notification device displaying further actions according to an embodiment of the invention. Notification device 760 includes a display for showing an exemplary list of actions that may be performed on the selected notification. As shown, the "Send Message to Group" action is selected.

Notification device 765 includes a display showing an email message pre-populated with the recipient email address (es), a subject line, and the content of the selected notification on the upper portion of the display. The lower portion of the email message may include any additional message the consumer wishes to send along with the selected notification. As shown, consumer types an additional message, "Is this yours?" The message may then be sent through typical email systems. Other forms of messaging are also contemplated without departing from the scope of the invention.

Figure 7E:
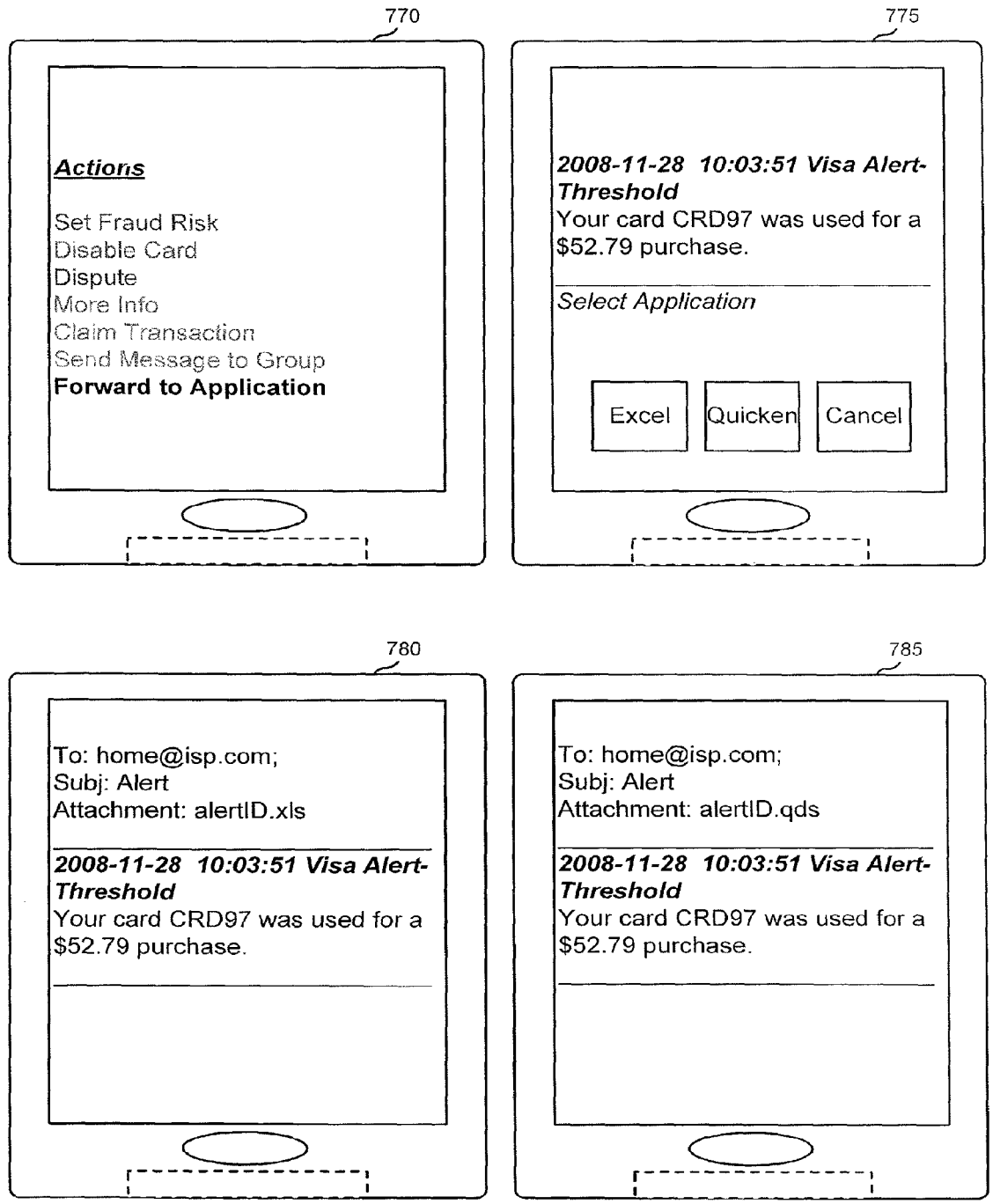
FIG. 7E is a series of schematic drawings of a notification device displaying additional actions according to an embodiment of the invention.

FIG. 7E is a series of schematic drawings of a notification device displaying additional actions according to an embodiment of the invention. Notification device 770 includes a display for showing an exemplary list of actions that may be performed on the selected notification. As shown, the "Forward to Application" action is selected.

Notification device 775 includes a display showing the selected notification on the upper portion of the display. The display provides indicators for enabling a consumer to select an application into which the notification will be formatted. The indicators may be determined according to the consumer's specifications which might have been set during the enrollment process. As shown, an "Excel" indicator, a "Quicken" indicator, and a "Cancel" indicator are provided. Selection of the "Excel" indicator may cause notification device 775 to send a request to payment processing network 26 to format the selected notification as an Excel file.

Notification device 780 includes a display showing an email message pre-populated with the recipient email address (es), a subject line, the content of the selected notification, and an attachment of the notification in the selected Excel format.

Notification device 785 includes a display showing an email message pre-populated with the recipient email addresses, a subject line, the content of the selected notification, and an attachment of the notification in the selected Quicken format.

Figure 8:
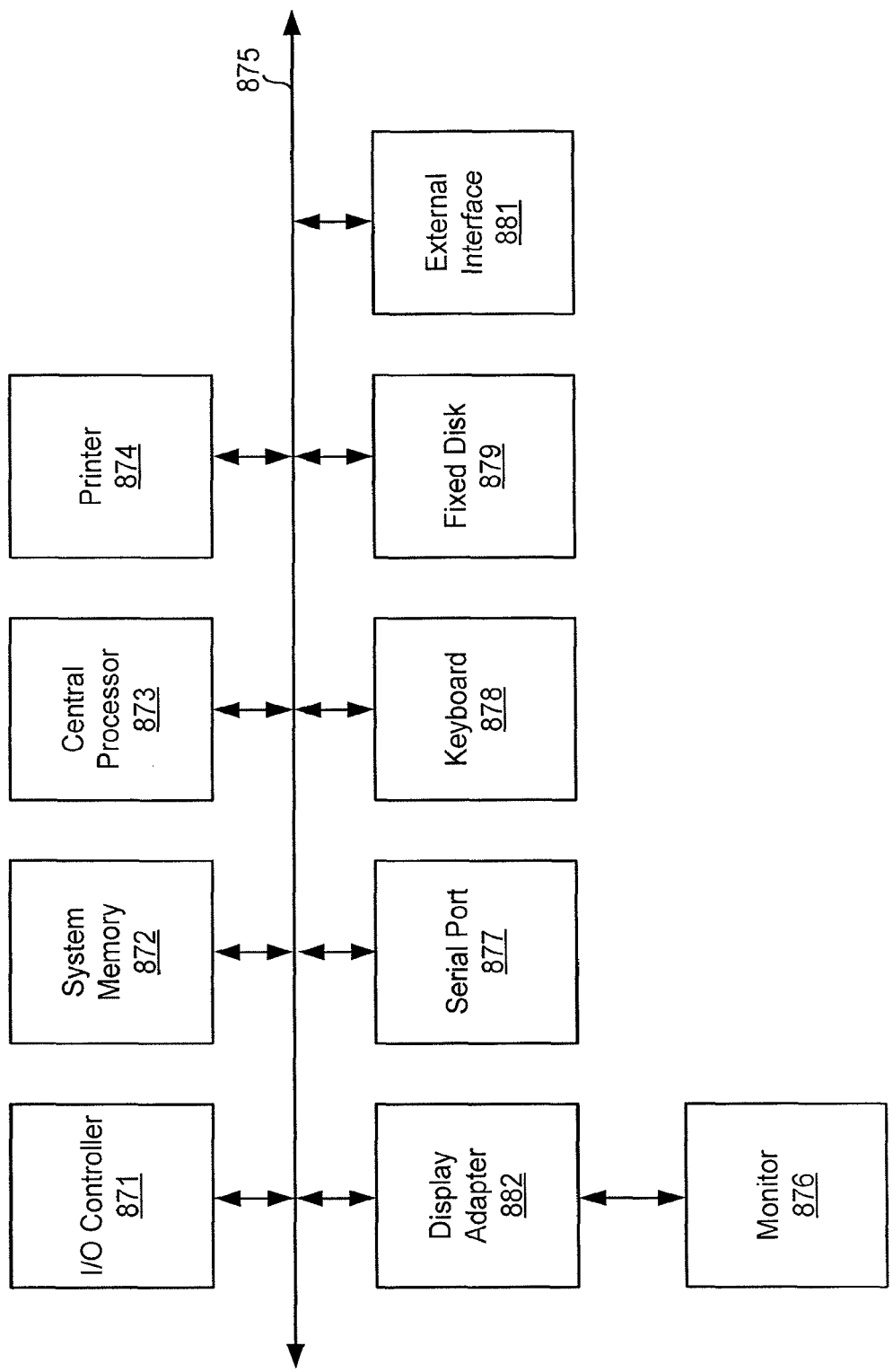
FIG. 8 is a block diagram of a computer apparatus.

Any of the server computers, client computers, and even some portable consumer devices described above may utilize any suitable number of subsystems. Examples of such subsystems or components are shown in FIG. 8, which is a block diagram of a computer apparatus. The subsystems shown in FIG. 8 are interconnected via a system bus 875. Additional subsystems such as a printer 874, keyboard 878, fixed disk 879, monitor 876, which is coupled to display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:
receiving an authorization request message associated with a transaction, the transaction associated with a consumer account and a merchant;
determining a geographic location of the transaction;
determining whether a notification message indicating that the transaction is occurring is required to be sent to a notification device operated by a consumer; and
sending the notification message to the notification device operated by the consumer, upon determining that the notification message is required,
wherein a graphical depiction of the notification message is thereafter displayed on a map on the notification device, wherein the notification device receives the notification message substantially simultaneously with the receipt of an authorization response message by the merchant.

2. The method of claim 1, wherein determining the geographic location of the transaction comprises determining a geographic location of an access device, a merchant, a consumer, or a portable consumer device associated with the transaction, further comprising:
determining a consumer icon identifying a geographic location of the notification device relative to the map; and
providing the consumer icon to the notification device.

3. The method of claim 1, wherein the transaction is selected among a list of one or more transactions.

4. The method of claim 1, wherein the steps of determining whether the notification message is required and sending the notification message are performed while processing the authorization request message.

5. The method of claim 1, further comprising:
determining a fraud score of the transaction; and
graphically representing the fraud score on the map.

6. The method of claim 1, further comprising:
determining one or more customized actions associated with the transaction;
providing to the consumer associated with the consumer account the one or more customized actions; and
receiving a selected action of the one or more customized actions.

7. The method of claim 6, wherein the selected action is an action for setting a fraud level for the transaction, the fraud level indicates a likelihood of fraud, further comprising:
determining a plurality of fraud levels;
receiving a selection of a fraud level of the plurality of fraud levels; and
associating the selected fraud level with the transaction.

8. The method of claim 6, wherein the selected action is an action for disabling the consumer account associated with the transaction.

9. The method of claim 6, wherein the selected action is an action for disputing the transaction.

10. The method of claim 6, wherein the selected action is an action for providing additional information about the transaction.

11. The method of claim 6, wherein the selected action is an action for enabling a consumer to claim ownership of the transaction, wherein the consumer account is associated with a plurality of authorized consumers.

12. The method of claim 6, wherein the selected action is an action for providing the notification message in an application-specific format, further comprising:
determining one or more application formats specified in an enrollment profile of a consumer associated with the consumer account;
providing one or more indicators for the one or more application formats;
receiving a selection of an indicator of the one or more indicators representing a selected application format;
formatting the notification message in the selected application format; and
providing the formatted notification to the consumer.

13. The method of claim 1 wherein determining that the notification message is required comprises detecting a notification event.

14. The method of claim 13 wherein the notification event is initiation of a transaction associated with the consumer account, a completion of a transaction with the consumer account, a transaction initiated by the consumer, a transaction over a certain amount of money, any transaction conducted with the consumer account, a spending threshold has been reached for the consumer account, a transaction is made outside a particular geographic location, a risky transaction is being conducted, a transaction is made without a physical portable consumer device, a cash transaction, a cash withdrawal, an online account has been accessed to initiate a transaction, a balance on the consumer account is exceeded, or a particular type of transaction is being conducted.

15. A notification device comprising:
a processor;
an antenna coupled to the processor; and
a computer readable medium coupled to the processor, the computer readable medium comprising code executable by the processor, the code comprising code of receiving a notification message, and code of generating a map comprising a graphical depiction of the notification message associated with a transaction conducted with a consumer account and a merchant, wherein the notification message is received by the notification device substantially simultaneously with the receipt of an authorization response message by the merchant.

16. A server computer comprising:
a processor; and
a computer readable medium coupled with the processor; the computer readable medium comprising code executable by the processor to:
receive an authorization request message associated with a transaction, the transaction associated with a consumer account and a merchant;
determine a geographic location of the transaction;
determine whether a notification message indicating that the transaction is occurring is required;
send the notification message to a notification device operated by a consumer, upon determining that the notification message is required,
wherein a graphical depiction of the notification message is displayed on a map on the notification device, the notification device receives the notification message substantially simultaneously with the receipt of an authorization response message by the merchant.

17. The server computer of claim 16, wherein the computer readable medium further comprises code executable by the processor to:
determine an icon identifying a geographic location of the merchant relative to the map; and
provide the icon to the notification device associated with the transaction.

18. The server computer of claim 16, wherein the computer readable medium further comprises code executable by the processor to:
determine a geographic location of an access device, a merchant, a consumer, or a portable consumer device associated with the selected transaction; and
determine a consumer icon identifying a geographic location of the notification device relative to the map.

19. The server computer of claim 16, wherein the steps of determining whether the notification message is required and sending the notification message are performed while processing the authorization request message.

20. The server computer of claim 16, wherein the computer readable medium further comprises code executable by the processor to:
determine one or more customized actions associated with the transaction, wherein the consumer associated with the consumer account is provided with the one or more customized actions and a selected action of the one or more customized actions is received.

21. A non-transitory machine-readable storage medium storing a sequence of instructions execution of which causes a processor to provide notifications of payment transactions, the execution of the sequence of instructions causes the processor to perform the actions of:
receiving an authorization request message associated with a transaction, the transaction associated with a consumer account and a merchant;
determining a geographic location of the transaction;
determining whether a notification message indicating that the transaction is occurring is required to be sent to a notification device operated by a consumer; and
sending the notification message to the notification device operated by the consumer, upon determining that the notification message is required,
wherein a graphical depiction of the notification message is displayed on a map on the notification device, the notification device receives the notification message substantially simultaneously with the receipt of an authorization response message by the merchant.

* * * * *